US011385686B2

(12) United States Patent
Ai et al.

(10) Patent No.: US 11,385,686 B2
(45) Date of Patent: *Jul. 12, 2022

(54) ELECTRONIC DEVICES WITH FLEXIBLE DISPLAYS AND HINGES

(71) Applicant: Apple Inc., Cupertino, CA (US)

(72) Inventors: Jiang Ai, San Jose, CA (US); Mitchell A. Heschke, Mountain View, CA (US); Soyoung Kim, Redwood City, CA (US); Stephen R. McClure, Belmont, CA (US)

(73) Assignee: Apple Inc., Cupertino, CA (US)

( * ) Notice: Subject to any disclaimer, the term of this patent is extended or adjusted under 35 U.S.C. 154(b) by 86 days.

This patent is subject to a terminal disclaimer.

(21) Appl. No.: 16/777,239

(22) Filed: Jan. 30, 2020

(65) Prior Publication Data

US 2020/0166974 A1    May 28, 2020

Related U.S. Application Data

(63) Continuation of application No. 15/232,505, filed on Aug. 9, 2016, now Pat. No. 10,551,880.

(60) Provisional application No. 62/338,827, filed on May 19, 2016, provisional application No. 62/217,219, filed on Sep. 11, 2015.

(51) Int. Cl.
 *G06F 1/16* (2006.01)
(52) U.S. Cl.
 CPC .......... *G06F 1/1681* (2013.01); *G06F 1/1652* (2013.01); *G06F 1/1618* (2013.01)

(58) Field of Classification Search
 CPC .... G06F 1/1681; G06F 1/1618; G06F 1/1652; G06F 1/1616; G09F 9/301
 See application file for complete search history.

(56) References Cited

U.S. PATENT DOCUMENTS

| | | | |
|---|---|---|---|
| 8,787,016 B2* | 7/2014 | Rothkopf | G06F 1/1681 |
| | | | 361/679.55 |
| 9,173,287 B1* | 10/2015 | Kim | G06F 1/1616 |
| 9,179,559 B1* | 11/2015 | Kim | H05K 5/0004 |
| 9,204,565 B1 | 12/2015 | Lee et al. | |
| 9,348,450 B1* | 5/2016 | Kim | G06F 1/1681 |
| 9,541,962 B2 | 1/2017 | Siddiqui | |
| 9,544,993 B2 | 1/2017 | Lee et al. | |
| 10,082,838 B1* | 9/2018 | Hong | E05D 7/00 |
| 10,281,951 B2* | 5/2019 | Vic | E05D 11/0054 |

(Continued)

OTHER PUBLICATIONS

Dialog NPL Search Report (Year: 2022).*

*Primary Examiner* — Hung S. Bui
*Assistant Examiner* — Sagar Shrestha
(74) *Attorney, Agent, or Firm* — Treyz Law Group, P.C.; G. Victor Treyz; Kendall P. Woodruff

(57) ABSTRACT

An electronic device may have a flexible display that overlaps an axis. The display may be supported by a housing. The housing may have first and second portions that rotate relative to each other about the axis. The housing may be placed in an unfolded configuration to support the display in a planar state. The housing may also be placed in a folded configuration by rotating the first and second portions relative to each other. A hinge mechanism may be used to ensure adequate separation between the first and second portions when the housing is bent. Movable flaps may be retracted when the housing is bent to create room for a bent portion of the display.

20 Claims, 37 Drawing Sheets

(56) References Cited

U.S. PATENT DOCUMENTS

| | | | |
|---|---|---|---|
| 2004/0052044 A1* | 3/2004 | Mochizuki | G06F 1/1679 361/679.15 |
| 2009/0070961 A1* | 3/2009 | Chung | E05D 3/122 16/354 |
| 2011/0150453 A1 | 6/2011 | Chang | |
| 2012/0002360 A1* | 1/2012 | Seo | G06F 1/1652 361/679.01 |
| 2012/0307423 A1 | 12/2012 | Bohn et al. | |
| 2012/0307472 A1 | 12/2012 | Bohn et al. | |
| 2013/0010405 A1* | 1/2013 | Rothkopf | H05K 5/0226 361/679.01 |
| 2013/0243608 A1 | 9/2013 | Sakamoto | |
| 2013/0314611 A1* | 11/2013 | Okutsu | H05K 5/0234 348/739 |
| 2013/0342090 A1 | 12/2013 | Ahn et al. | |
| 2013/0342094 A1* | 12/2013 | Walters | G06F 1/1615 312/319.2 |
| 2014/0003006 A1* | 1/2014 | Ahn | G06F 1/1652 361/749 |
| 2014/0065326 A1* | 3/2014 | Lee | G09F 9/301 428/12 |
| 2014/0111954 A1* | 4/2014 | Lee | G06F 1/1652 361/749 |
| 2014/0226275 A1 | 8/2014 | Ko et al. | |
| 2014/0328041 A1 | 11/2014 | Rothkopf et al. | |
| 2014/0355195 A1* | 12/2014 | Kee | G06F 1/1641 361/679.27 |
| 2015/0055287 A1 | 2/2015 | Seo | |
| 2015/0233162 A1 | 8/2015 | Lee et al. | |
| 2015/0241925 A1* | 8/2015 | Seo | G06F 1/1681 361/679.27 |
| 2015/0267450 A1 | 9/2015 | Chiang | |
| 2015/0361696 A1 | 12/2015 | Tazbaz | |
| 2015/0362958 A1* | 12/2015 | Shang | E05D 5/04 361/679.58 |
| 2015/0366089 A1 | 12/2015 | Park et al. | |
| 2015/0378397 A1* | 12/2015 | Park | G06F 1/1652 361/679.27 |
| 2016/0060927 A1* | 3/2016 | Xu | G06F 1/1681 361/679.55 |
| 2016/0062408 A1* | 3/2016 | Lee | G06F 1/1616 345/173 |
| 2016/0062412 A1* | 3/2016 | Park | G06F 1/1616 361/679.27 |
| 2016/0070306 A1* | 3/2016 | Shin | G06F 1/1626 361/679.27 |
| 2016/0085265 A1* | 3/2016 | Park | G06F 1/1681 361/807 |
| 2016/0109908 A1 | 4/2016 | Siddiqui | |
| 2016/0195901 A1 | 7/2016 | Kauhaniemi et al. | |
| 2016/0227645 A1 | 8/2016 | Hampton et al. | |
| 2016/0295709 A1* | 10/2016 | Ahn | H05K 5/0226 |
| 2017/0060188 A1* | 3/2017 | Han | G06F 1/1641 |
| 2017/0192460 A1* | 7/2017 | Watanabe | G09F 9/00 |

* cited by examiner

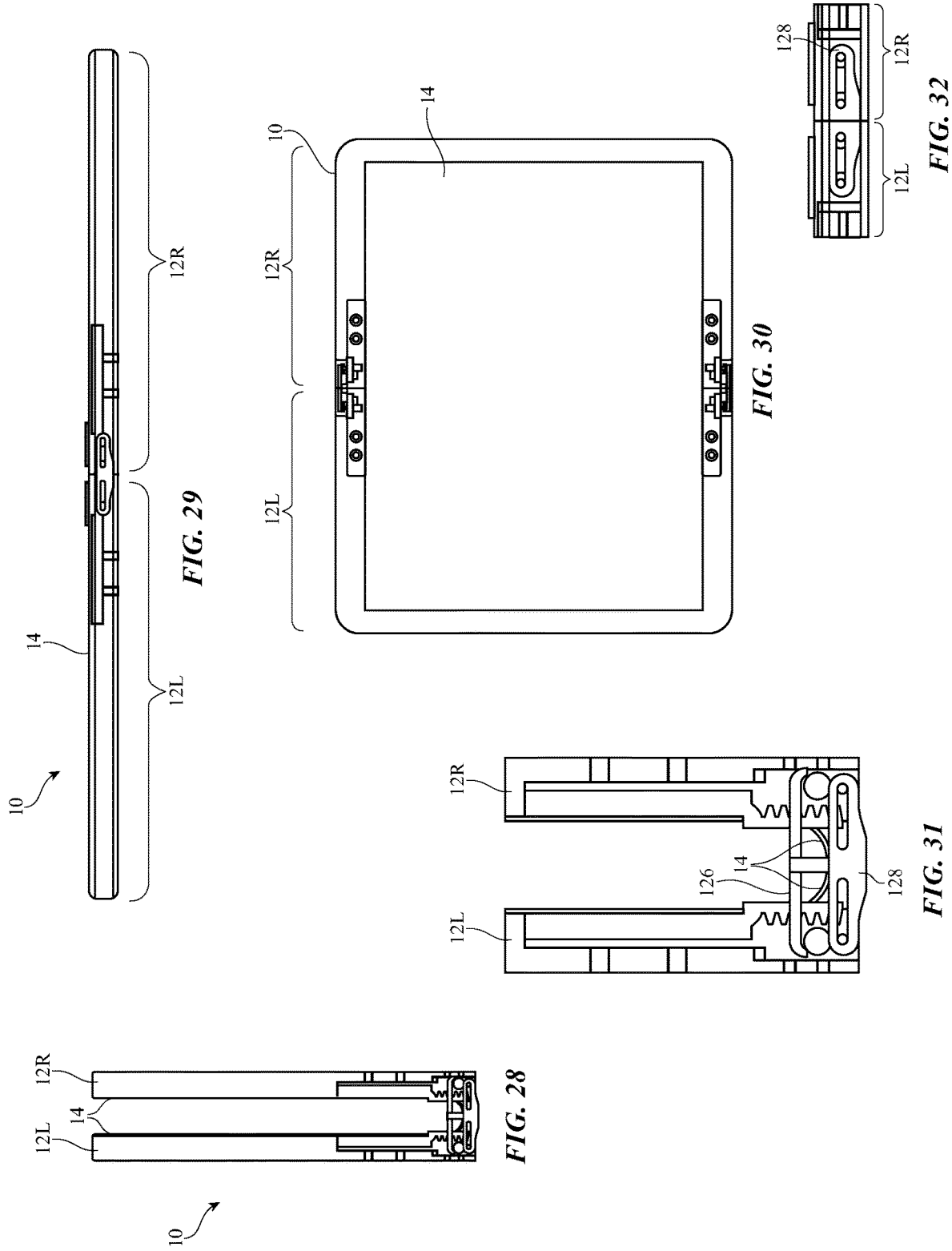

ELECTRONIC DEVICES WITH FLEXIBLE DISPLAYS AND HINGES

This application is a continuation of patent application Ser. No. 15/232,505, filed Aug. 9, 2016, which claims the benefit of provisional patent application No. 62/217,219, filed Sep. 11, 2015, and provisional patent application No. 62/338,827, filed May 19, 2016, all of which are hereby incorporated by reference herein in their entireties.

FIELD

This relates generally to electronic devices, and, more particularly, to electronic devices with displays.

BACKGROUND

Electronic devices often include displays for presenting image to a user. Displays are typically formed from rigid planar substrates. Although satisfactory in many situations, rigid displays such as these may be difficult to integrate into certain devices, such as devices with bendable housings.

SUMMARY

An electronic device may have a flexible display. The display may be mounted in a foldable housing that can bend about a bend axis. In a first configuration, the display may be supported by the housing and may be held in a planar state. In a second configuration, portions of the housing may be rotated about the bend axis with respect to each other, so the housing and display are bent.

A hinge mechanism may be used to ensure adequate separation between first and second portions of the housing when the housing is bent. This ensures that the flexible display can maintain a desired minimum bend radius in the vicinity of the bend axis. The hinge mechanism may be based on a rack-and-gear arrangement or other arrangement that maintains the first and second housing portions at a desired distance from each other.

With another arrangement, the housing may have movable flaps that extend parallel to the bend axis. The movable flaps may be placed in a planar configuration to support the display when the housing is in its unbent state. The movable flaps may be retracted when the housing is placed in its bent state. This creates room for a bent portion of the display along the bend axis.

Further features will be more apparent from the accompanying drawings and the following detailed description.

BRIEF DESCRIPTION OF THE DRAWINGS

FIG. 28 is a side view of an illustrative electronic device with hinge structures that allow the device to be bent in accordance with an embodiment.

FIG. 29 is a side view of the electronic device of FIG. 28 in an unfolded configuration in accordance with an embodiment.

FIG. 30 is a front view of the device of FIG. 29 in accordance with an embodiment.

FIG. 31 is a side view of the hinge structures of FIG. 28 in accordance with an embodiment.

FIG. 32 is a cross-sectional side view of the hinge structures of FIG. 29 in accordance with an embodiment.

DETAILED DESCRIPTION

Figure 1:
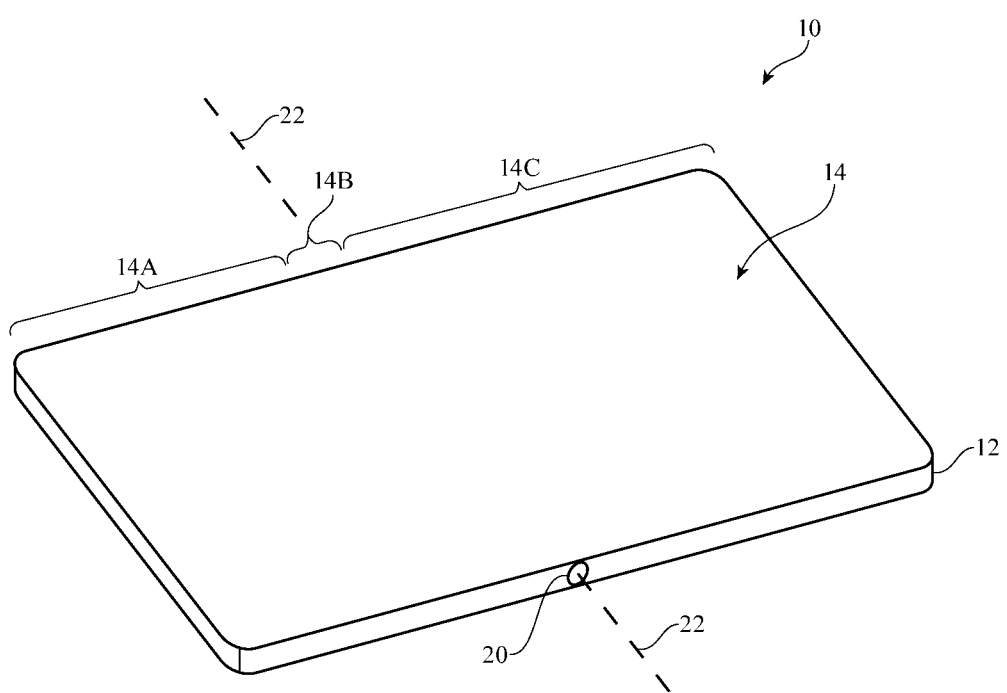
FIG. 1 is a perspective view of an illustrative electronic device having a display in accordance with an embodiment.

An illustrative electronic device of the type that may be provided with a flexible display is shown in FIG. 1. Electronic device 10 may be a computing device such as a laptop computer, a computer monitor containing an embedded computer, a tablet computer, an electronic book, a cellular telephone, a media player, or other handheld or portable electronic device, a smaller device such as a wrist-watch device, a pendant device, a wearable or miniature device of other types, a computer display that does not contain an embedded computer, a computer display that includes an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, electronic book, watch or other wrist device, or other portable computing device. Other configurations may be used for device 10 if desired. The example of FIG. 1 is merely illustrative.

In the example of FIG. 1, device 10 includes a display such as display 14 mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Housing 12 may have hinge structures such as hinge 20 to allow device 10 to fold or otherwise bend about bend axis 22 (sometimes referred to as a fold axis, hinge axis, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures. A touch sensor may be formed using electrodes or other structures on a display layer that contains a pixel array or on a separate touch panel layer that is attached to the pixel array (e.g., using adhesive).

Display 14 may include pixels formed from liquid crystal display (LCD) components, electrophoretic pixels, microelectromechanical (MEMs) shutter pixels, electrowetting pixels, micro-light-emitting diodes (small crystalline semiconductor die), organic light-emitting diodes (e.g., a thin-film organic light-emitting diode display), or pixels based on other display technologies. Display 14 may be formed from a single display panel (e.g., a single organic light-emitting diode layer) or may be formed form two panels (e.g., two organic light-emitting diode layers, two liquid crystal display modules, etc.).

In a configuration with a single display panel, the entire display panel or at least the center of the display panel may be formed using flexible structures that allow the display to be bent along the bend axis of device 10. A display cover layer or other layer may form the outermost surface of the display. Display layers such these (e.g., display cover layers) may be formed from glass, plastic, and/or other transparent display cover layer structures. The outermost display layer (e.g., a display cover layer) and underlying display layers (e.g., a polymer substrate, metal traces, and other conducting and dielectric layers in an organic light-emitting diode panel) may be flexible or may at least have a flexible center portion aligned with the bend axis of device 10. As shown in FIG. 1, for example, display 14 may have three areas such as areas 14A, 14B, and 14C. In areas 14A and 14C, display 14 may be flexible or may be rigid. In area 14B, which forms a strip that lies between areas 14A and 14C, display 14 is flexible to accommodate bending of display 14, housing 12, and device 10 about bend axis 22.

Figure 2:
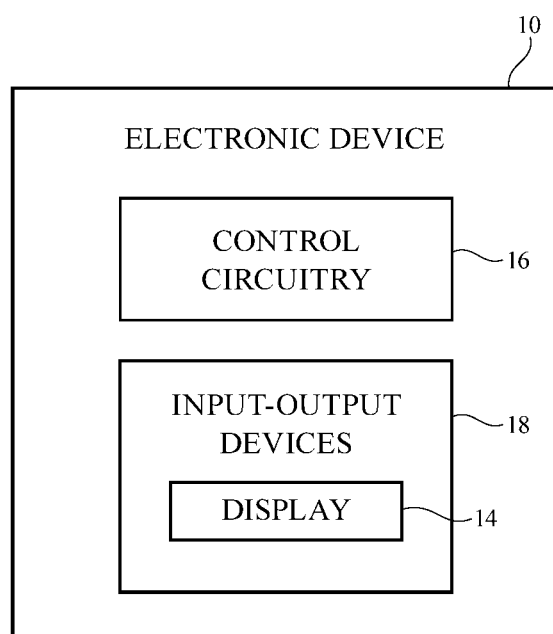
FIG. 2 is a schematic diagram of an illustrative electronic device having a display in accordance with an embodiment.

A schematic diagram of an illustrative electronic device such as device 10 of FIG. 1 is shown in FIG. 2. As shown in FIG. 2, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 18 may be used to allow data to be supplied to device 10 and to allow data to be provided from device 10 to external devices. Input-output devices 18 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 18 and may receive status information and other output from device 10 using the output resources of input-output devices 18. Input-output devices 18 may include a display such as display 14 of FIG. 1.

Control circuitry 16 may be used to run software on device 10 such as operating system code and applications. During operation of device 10, the software running on control circuitry 16 may display images on display 14 (e.g., video, still images such as text, alphanumeric labels, photographs, icons, other graphics, etc.) using an array of pixels in display 14.

Figure 3:
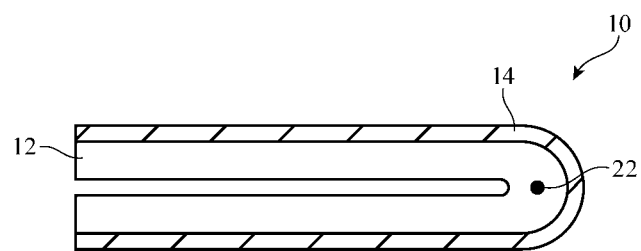
FIGS. 3 and 4 are cross-sectional side views of electronic devices with flexible displays in accordance with an embodiment.
Figure 4:
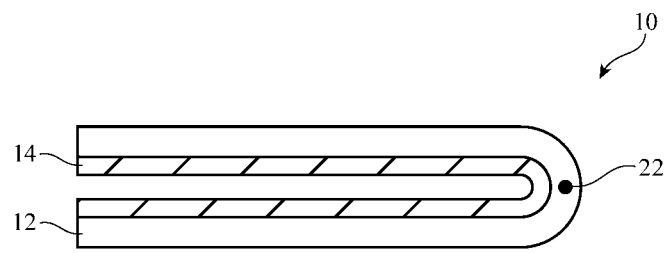

As shown in FIG. 3, device 10 may be folded (bent outwardly by 180° or other suitable amount) about bend axis 22 so that display 14 is visible from the outside of device 10 in its folded state. In this configuration, a first portion of display 14 faces outwardly from one half of device 10 and a second portion of display 14 faces outwardly from another half of device 10 (and faces away from the first portion). FIG. 4 shows how device 10 may be folded inwardly by 180° or other suitable amount about bend axis 22 so that display 14 is protected within the interior of device 10. Device 10 may have hinges that allow outward bending (folding) of the type shown in FIG. 3, that allow inward bending (folding) of the type shown in FIG. 4, or that allow bending of both the type shown in FIG. 3 and the type shown in FIG. 4. Configurations in which device 10 is flexed by different amounts (e.g., more than 180° or less than 180°) may also be used.

Display 14 may have an outermost layer formed from clear glass, transparent plastic, sapphire, or other transparent materials that serve as a protective layer for thin-film transistor circuitry and other display structures. The outer display layer may sometimes be referred to as a display cover layer. In some configurations for display 14, the outermost layer of the display may serve both as a protective layer (display cover layer) and as a substrate for display structures (touch sensors electrodes, color filter elements, thin-film transistors, etc.). In other configurations, the display cover layer is free of circuitry and serves solely as a protective layer for underlying display structures (e.g., one or more underlying display panels).

Figure 5:
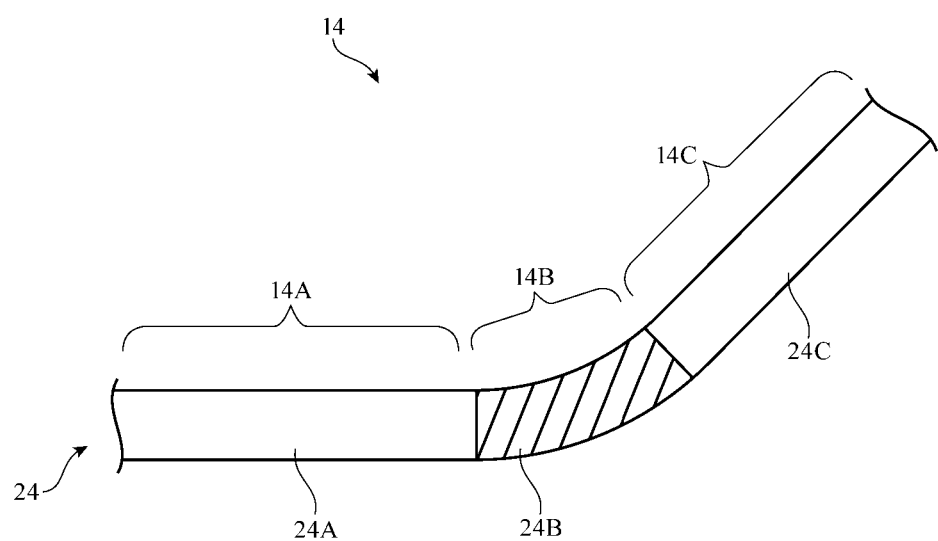
FIG. 5 is a cross-sectional side view of an illustrative display layer with a bent portion in accordance with an embodiment.

As shown in FIG. 5, the display cover layer and other display layers forming display 14 (i.e., display layers 24) may have outer portions 24A and 24C that are formed on opposing sides of center portion 24B. Outer portions 24A and 24C may be rigid planar layers or may be planar flexible layers. Configurations in which portions 24A and 24C have non-planar shapes may also be used. Between portions 24A and 24C of display layers 24, display layers 24 may have a flexible portion such as portion 24B. Portion 24B may bend about bend axis 22 to allow display 14 to bend as housing 12 is bent about hinge 20.

Figure 6:
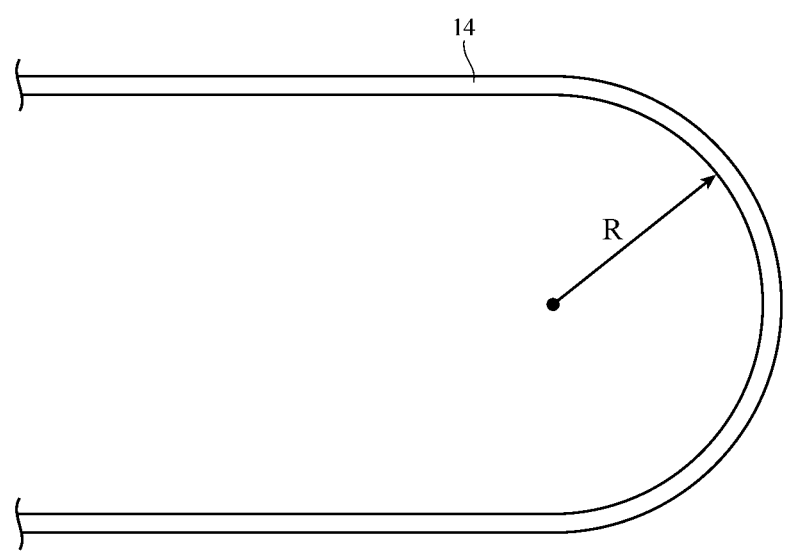
FIG. 6 is a cross-sectional side view of a flexible display that has maintained a minimum bend radius while bending in accordance with an embodiment.

To prevent metal lines and other thin-film structures in display 14 from becoming damaged (e.g., due to cracking), a safe minimum bend radius R may be maintained for display 14 when bending display 14 about bend axis 22, as shown in FIG. 6. The value of R may be 0.5 mm to 5 mm, 0.3 mm to 3 mm, more than 1 mm, more than 5 mm, more than 10 mm, less than 7 mm, less than 4 mm, less than 1 mm, or other suitable value.

Housing 12 preferably has structures that help maintain a suitable minimum bend radius R in display 14 during bending. With one suitable arrangement, which may sometimes be described herein as an example, housing 12 may be provided with movable structures such as retractable flaps that run along axis 22. When device 10 is in its planar state, the flaps may rest in a planar orientation to support display 14 and ensure that display 14 is planar where overlapping axis 22. When device 10 is in its folded state, the flaps may retract, thereby providing display 14 with room to accommodate a desired bend radius R in display 14.

Figure 7:
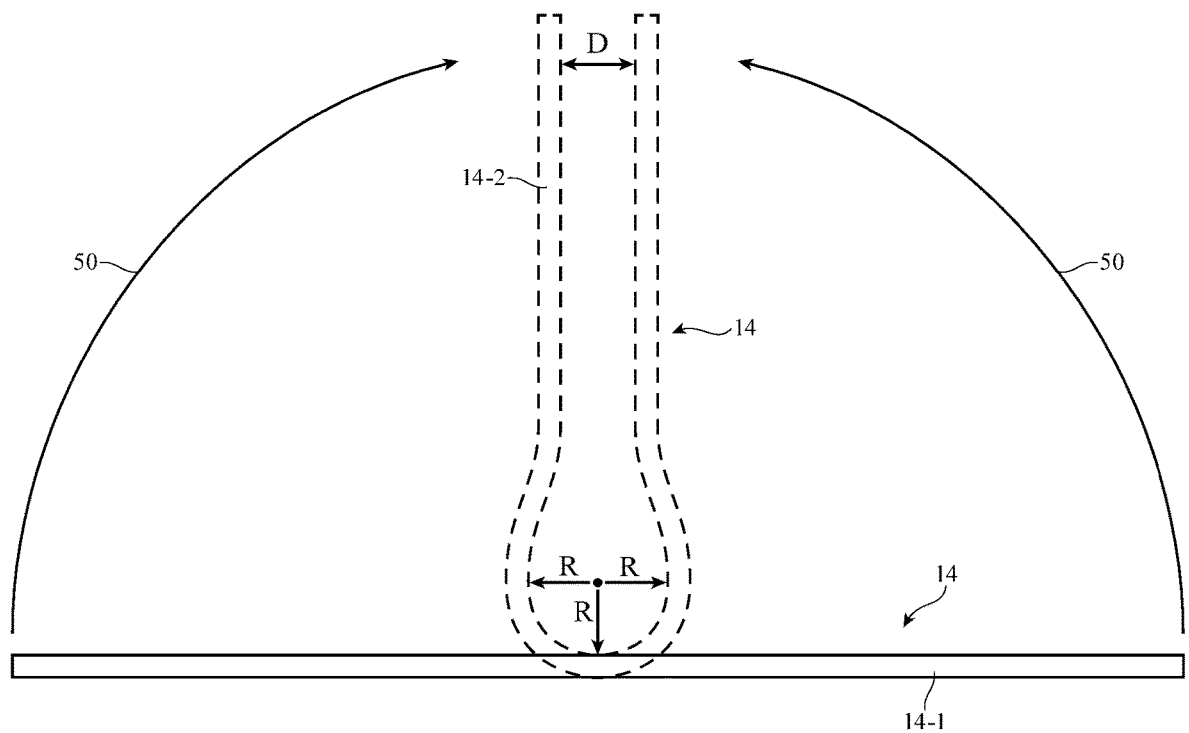
FIG. 7 is a cross-sectional side view of an illustrative flexible display in folded and unfolded configurations in accordance with an embodiment.

FIG. 7 is a cross-sectional side view of an illustrative flexible display in folded and unfolded configurations. Display 14 may be a flexible display that can bend about bend axis 22, as described in connection with FIG. 3. Display 14 may, as an example, be placed in unfolded position 14-1 in which the surface of display 14 is planar or in folded position 14-2 in which portions of the active surface of display 14 are folded inwardly in directions 50 towards each other (and are separated by distance D). The value of distance D may be 0-2 mm, less than 1 mm, less than 0.2 mm, etc. To ensure that display 14 is not damaged, the portion of display 14 that lies near the bend axis for display 14 may be bent while maintaining a minimum bend radius of R. In some configurations, this may cause the separation (2R) between opposing portions of display 14 to be larger in the vicinity of the bend in display 14 than at other locations such as the edges of display 14 (i.e., the value of 2R may be more than D).

Figure 8:
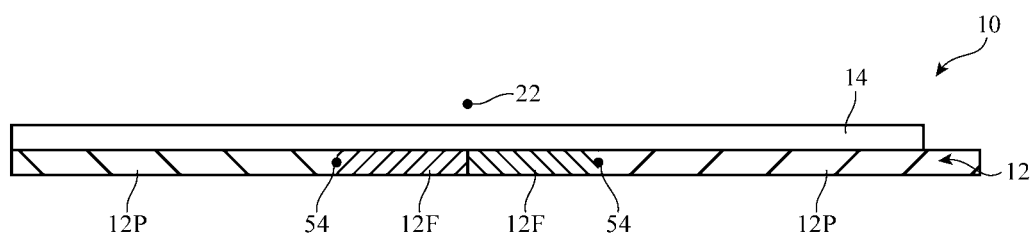
FIG. 8 is a cross-sectional side view of an illustrative electronic device having housing flaps adjacent to a flexible display bend axis in accordance with an embodiment.

To accommodate the relatively wide distance between the opposing portions of display 14 in the vicinity of the bend in display 14 (i.e., near axis 22), housing 12 may be provided with retractable flaps. As shown in FIG. 8, for example, housing 12 may have planar portions 12P (sometimes referred to as housing plates, planar support members, planar support structures, or display support plates) and flaps 12F. Flaps 12F may run along the center of display 14 in the portion of display 14 that overlaps bend axis 22.

Figure 9:
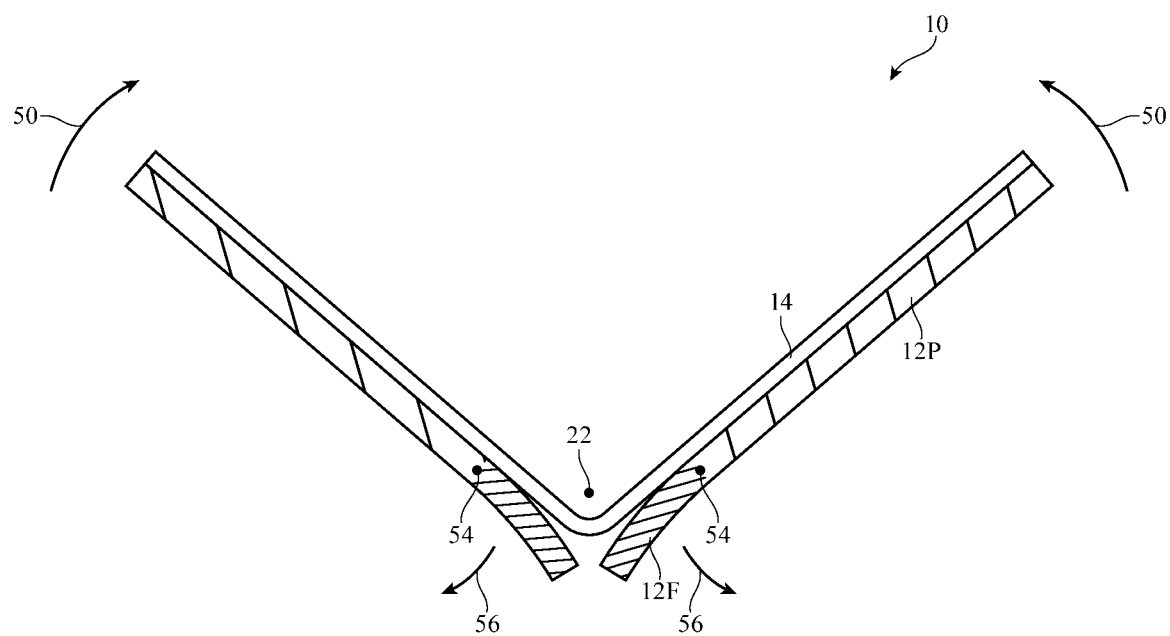
FIG. 9 is a cross-sectional side view of the illustrative electronic device of FIG. 8 in a configuration in which the housing has been folded and the flaps have retracted to accommodate bending of the flexible display in accordance with an embodiment.
Figure 10:
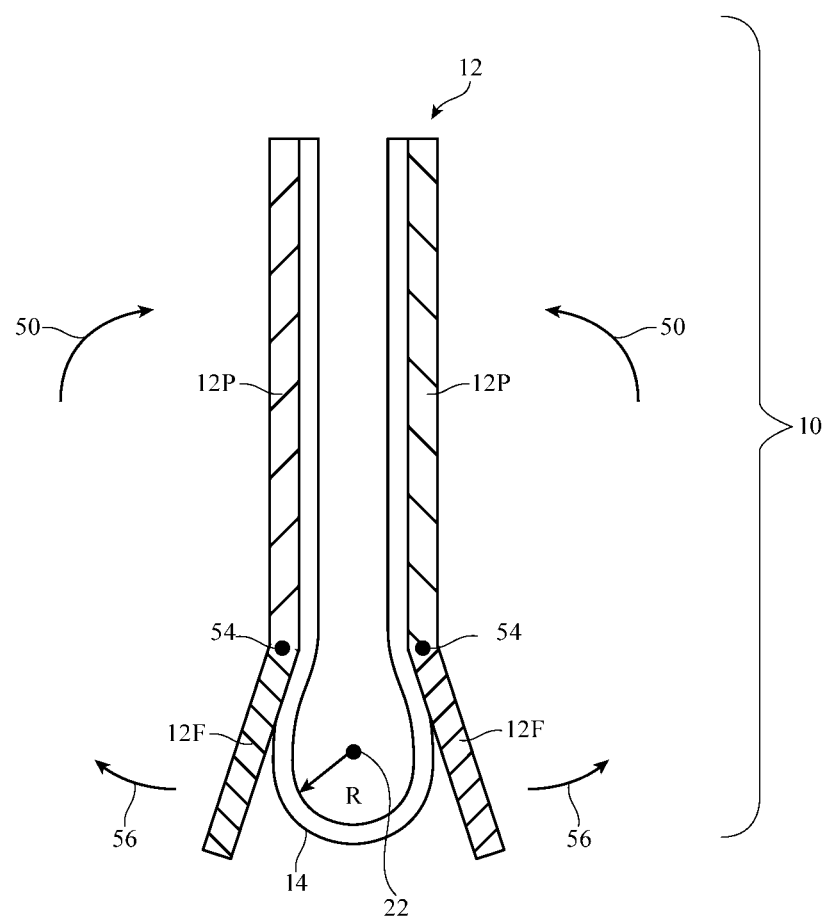
FIG. 10 is a cross-sectional side view of the illustrative device of FIG. 9 in a fully folded configuration in accordance with an embodiment.

Planar portions 12P may be planar support members (e.g., rectangular support plates). Flaps 12F may be mounted to flap hinges 54 or other structures that allow flaps 12F to pivot relative to housing plates 12P when housing 12 and display 14 are folded about bend axis 22. As shown in FIG. 9, for example, flaps 12F may pivot outwardly in directions 56 (away from and out of the respective planes in which planar members 12P lie) when device 10 is folded about axis 22. As shown in the fully folded configuration of FIG. 10, the pivoting motion of flaps 12F creates additional room for display 14 in the portion of display 14 that overlaps axis 22 (e.g., to allow a desired minimum bend radius R to be maintained in display 14, as described in connection with FIG. 8).

Figure 11:
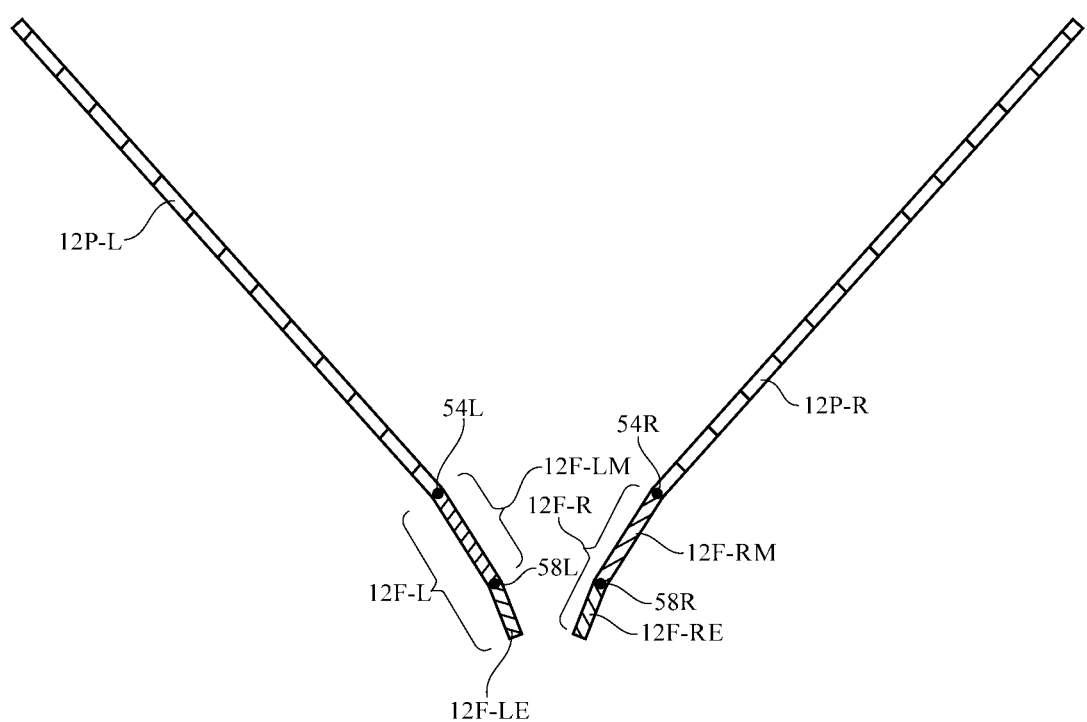
FIG. 11 is a cross-sectional side view of an illustrative electronic device with flaps having bendable flap extensions in accordance with an embodiment.

If desired, the pivoting flaps in housing 12 may have multiple parts. As shown in FIG. 11, for example, left flap 12F-L may be a two-part flap that includes main left flap 12F-LM and left flap extension 12F-LE. Right flap 12F-R may be a two-part flap that includes main right flap 12F-RM and right flap extension 12F-RE. Main left flap 12F-LM may pivot about hinge 54L. When device 10 is folded, flap 12F-LM may pivot out of the plane in which left plate 12P-L lies. Flap extension 12F-LE may pivot relative to flap 12F-LM about hinge axis 58L. When device 10 is folded, for example, flap 12F-LE may pivot out of the plane in which main left flap 12F-LM lies. Main right flap 12F-RM may pivot about hinge 54R. When device 10 is folded, flap 12F-RM may pivot out of the plane in which right plate 12P-R lies. Flap extension 12F-RE may pivot relative to flap 12F-RM about hinge axis 58R. When device 10 is folded, for example, flap 12F-RE may pivot out of the plane in which main right flap 12F-RM lies. As shown in the partly folded configuration of FIG. 11, the movements of the two-part flaps during device folding may help create additional room for display bending while maintaining a desired minimum bend radius in display 14.

Figure 12:
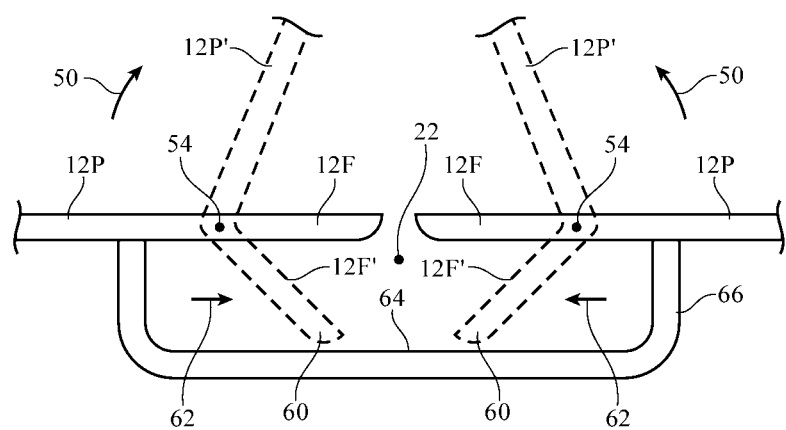
FIG. 12 is a cross-sectional side view of an illustrative hinge structure for an electronic device that has a structure that helps position housing flaps during movement of the housing in accordance with an embodiment.

An illustrative arrangement that may be used to help pivot flaps in housing 12 during device folding is shown in FIG. 12. FIG. 12 is a cross-sectional side view of an illustrative hinge structure for an electronic device that has a flap positioning structure that helps position housing flaps during movement of the housing. As shown in FIG. 12, housing 12 may include foldable plates 12P and flaps 12F that pivot about hinge axes 54. In the unfolded state for device 10, plates 12P and flaps 12F lie in a common plane. When device 10 is bend about bend axis 22, plates 12P move in directions 50 to positions 12P' and flaps 12F pivot about hinges 54 to positions 12F'. Flap positioning structure 66, which may sometimes be referred to as a rear housing cover or hinge cover, other structure in device 10 may be coupled to other structures in housing 12. When device 10 and housing 12 are folded, flap tips 60 may contact inner surface 64 of structure 66, thereby causing tips 60 to more towards each other in directions 62. The presence of flap positioning structures 66 therefore helps create appropriate pivoting movement of flaps 12F when device 10 is folded.

The sliding movement of flap tips 60 relative to structure 66 and the rotational motion of plates 12P and flaps 12F relative to each other can be accommodated using any suitable linkages (e.g., gears, rotating shafts, pin-and-slot structures, sliding members, hinges, or other linkages). FIGS. 13, 14, 15, 16, 17, and 18 are cross-sectional side views of illustrative linkages for use in hinges for foldable electronic device housings. In the examples of FIGS. 13, 14, 15, 16, 17, and 18, two different housing structures 12-1 and 12-2 are being coupled to each other (while being allowed to rotate, slide, and otherwise move with respect to each other). Structures 12-1 and 12-2 may be portions of flaps, portions of flap extensions (e.g., in a two-part flap configuration), may be portions of plates 12P, may be internal housing structures, may be external housing walls or portions of external housing walls, may be attached to display 14 or portions of display 14, or may otherwise be associated with housing 12 and device 10.

Figure 13:
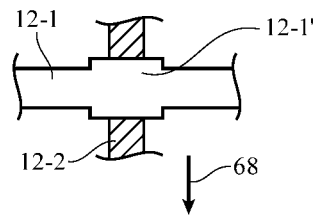
FIGS. 13, 14, 15, 16, 17, and 18 are cross-sectional side views of illustrative linkages for use in hinges for foldable electronic device housings in accordance with an embodiment.

In the example of FIG. 13, housing structures 12-1 and 12-2 have mating grooves or other structures that allow structures 12-1 and 12-2 to slide with respect to each other. Structure 12-1 may, for example, have a portion such as portion 12-1' with an opening that receives structure 12-2 and thereby allows structure 12-2 to slide in direction 68 with respect to structure 12-1.

Figure 14:
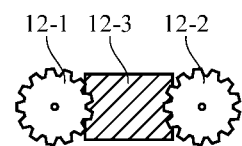

FIG. 14 shows how structures 12-1 and 12-2 may include gears with teeth (e.g., teeth that engage corresponding teeth in structure 12-3). In this type of structure, structures 12-1 and 12-2 may rotate relative to each other and relative to structure 12-3. Structure 12-3 may be, for example, a helical gear having teeth than engage both the teeth of structure 12-1 and the teeth of structure 12-2 (as an example). This type of linkage may be used to couple movement of structure 12-1 to movement of structure 12-2.

Figure 15:
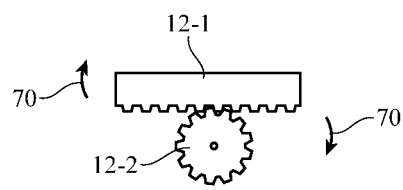

FIG. 15 shows how structure 12-1 may have an elongated shape with teeth and structure 12-2 may be a gear with mating teeth. This type of arrangement may allow structure 12-1 to rotate in directions 70 while walking around structure 12-2.

Figure 16:
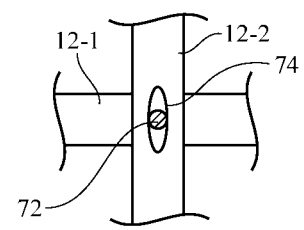

With the illustrative linkage of FIG. 16, structure 12-1 has pin 72 that is received within slot 74 of structure 12-2. This allows structures 12-1 and 12-2 to rotate and slide with respect to each other.

Figure 17:
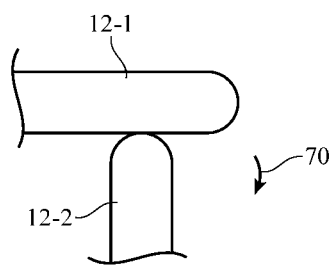

In the illustrative configuration of FIG. 17, structures 12-1 and 12-2 bear against each other, which allows structure 12-1 to walk around the surface of structure 12-2 in direction 70. Because structures 12-1 and 12-2 of FIG. 17 do not have gears, there may be slippage between the mating surfaces of structures 12-1 and 12-2.

Figure 18:
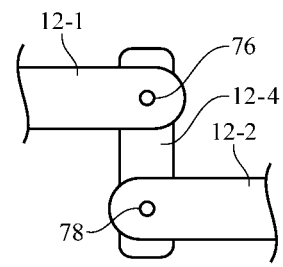

FIG. 18 shows how structures 12-1 and 12-2 may be linked using multiple hinge structures (e.g., hinges 76 and 78 on linking member 12-4). If desired, hinges 76 and/or 78 may use pin and slot structures to accommodate sliding movement.

If desired, biasing structures (coil springs, leaf springs, elastomeric materials, compressible foam, magnets, ferromagnetic material, etc.) may be used in biasing structures 12-1 and 12-2 relative to each other and/or relative to other structures. Moreover, different types of linkages may be used in coupling structures 12-1 and 12-2. The configurations of FIGS. 13, 14, 15, 16, 17, and 18 are merely illustrative.

Figure 19:
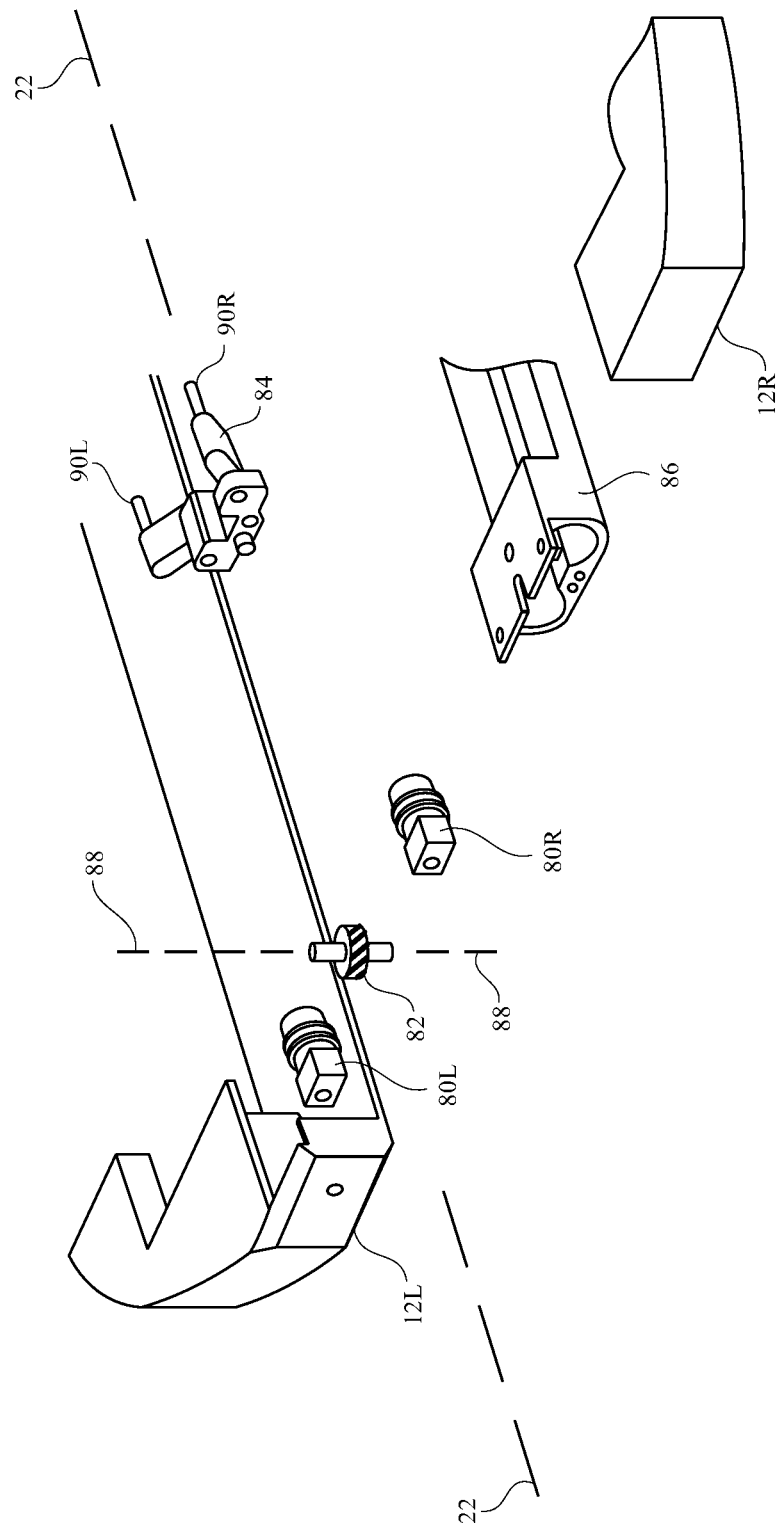
FIG. 19 is an exploded perspective view of illustrative hinge structures for an electronic device in accordance with an embodiment.

An exploded perspective view of illustrative hinge structures for electronic device 10 is shown in FIG. 19. As shown in FIG. 19, at each end of axis 22, housing 12 may include gears 80L and 80R. Gear 80L may be mounted to a first half of housing 12 (e. g., left housing portion 12L) and gear 80R may be mounted to a right half of housing 12 (e.g., right housing portion 12R). Housings 12R and 12L (and therefore respective gears 80L and 80R) may rotate about respective axes that run parallel to axis 22.

Helical gear 82 may have teeth that engage the respective teeth of gears 80L and 80R, thereby coupling movement of gear 80L (and therefore housing portion 12L) to movement of gear 80R (and therefore housing portion 12R). Helical gear 82 may rotate about helical gear axis 88 (i.e., an axis that runs perpendicular to axis 22). Bracket 84 has openings that receive the shaft of helical gear 82 and shafts associated with gears 80L and 80R. Bracket 84 and the gears coupled to bracket 84 may be mounted within gear housing 86.

During movement of left housing 12L (e.g., the main left plate of housing 12) about bend axis 22, the presence of gears 80L, 82, and 80R ensures that right housing 12R will rotate about bend axis 22 by an equal amount (i.e., gears 80L, 82, and 80R form a linkage that causes rotation of one half of housing 12 to be mirrored by rotation of the other half of housing 12). During rotation of the main left and right portions of housing 12 (i.e., the left and right plates 12P), pin 90L of bracket 84 will slide within a mating slot in the left flap 12F of housing 12 and pin 90R will slide within a mating slot in the right flap 12F of housing 12, thereby causing flaps 12F to retract as described in connection with FIGS. 8, 9, and 10.

Figure 20:
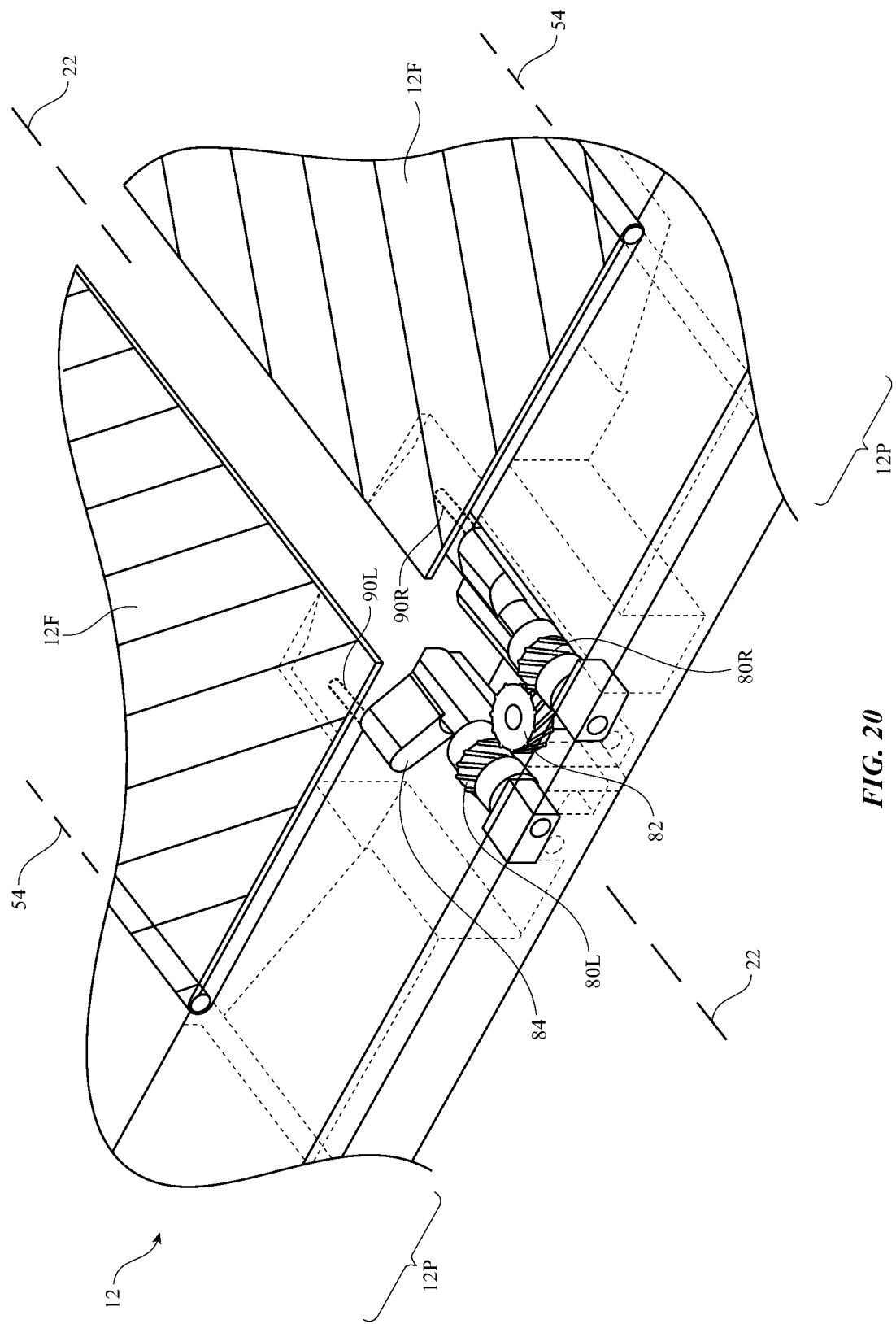
FIG. 20 is a perspective view of structures of the type shown in FIG. 19 assembled to form an electronic device hinge in accordance with an embodiment.
Figure 21:
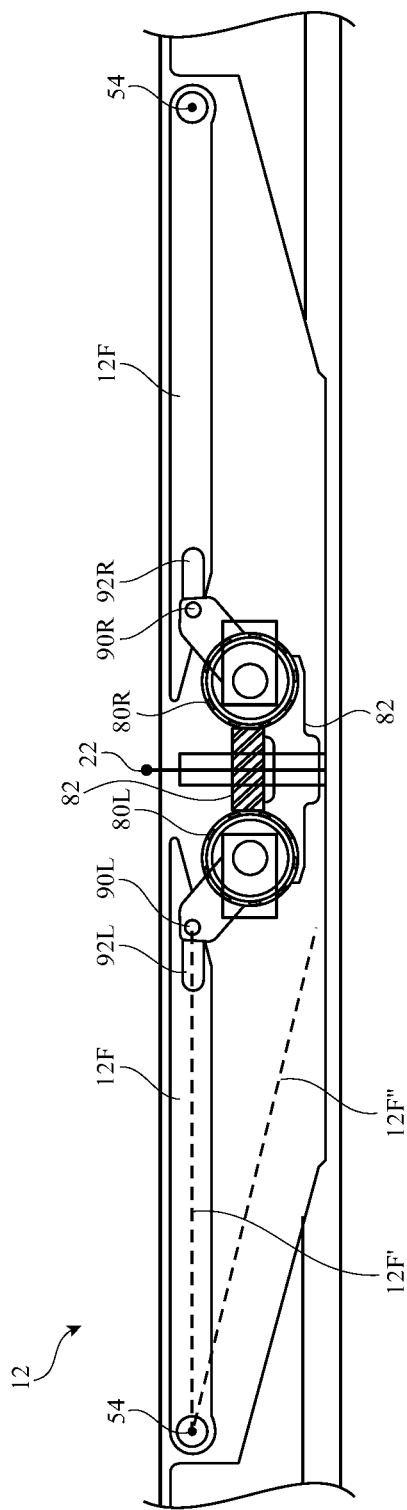
FIG. 21 is a cross-sectional side view of an illustrative electronic device having a hinge structure of the type shown in FIG. 20 in accordance with an embodiment.
Figure 22:
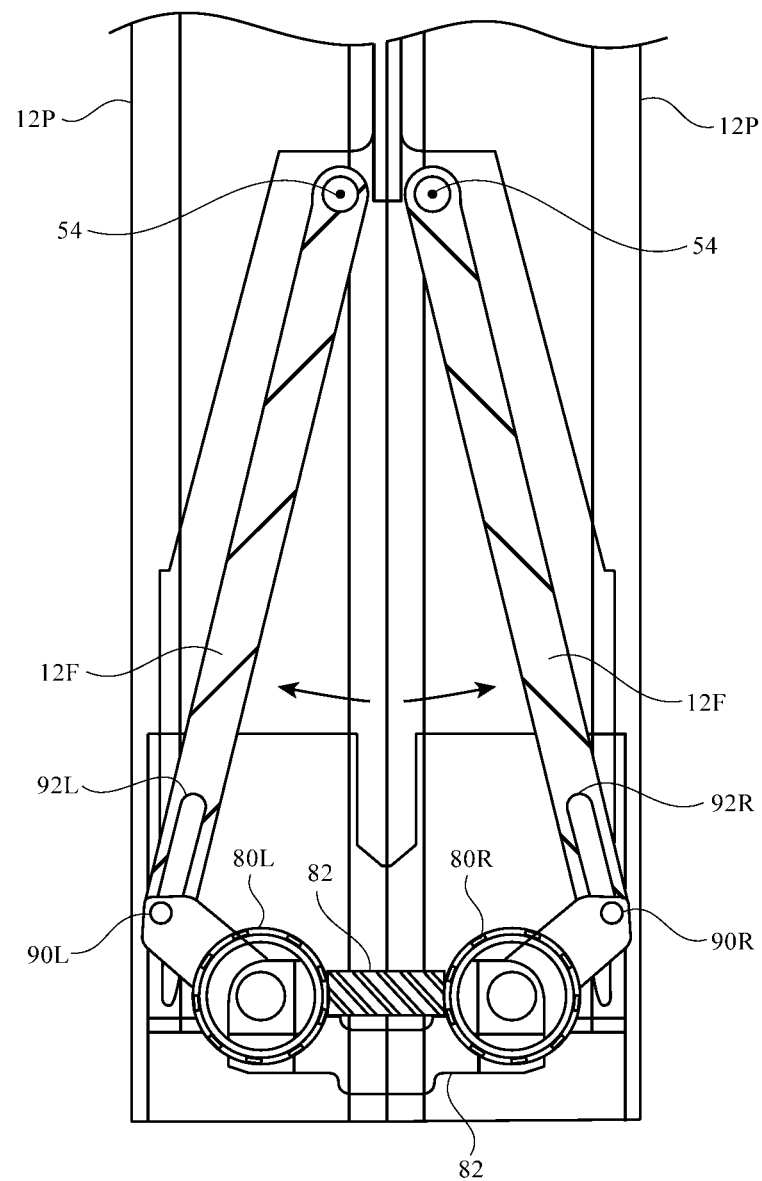
FIG. 22 is a cross-sectional side view of the electronic device of FIG. 21 in a folded configuration in accordance with an embodiment.

An assembled version of device 10 in which gear housing 86 has been removed so as not to obscure gears 80L and 80R is shown in FIG. 20. FIG. 21 shows how flaps 12F may have slots such as left slot 92L to receive pin 90L on bracket 82 and right slot 92R to receive pin 90R on bracket 82. When housing 12 is folded along axis 22, pin 90P will slide within slot 92R and the associated flap 12F in housing 12 will move from planar position 12F' to retracted (pivoted) position 12F". The position of flap 12F when retracted is shown in FIG. 22, in which housing 12 is in its folded configuration. Gears 80R and 80L, which are coupled using helical gear 82, are coupled to the left and right portions of housing 12, respectively, and ensure that while the left flap is retracting by a given amount, the right flap is retracting by the same amount.

If desired, the left and right halves of housing 12 can be coupled using a gear-and-rack mechanism. An illustrative mechanism of this type is shown in FIGS. 23, 24, 25, and 26.

Figure 23:
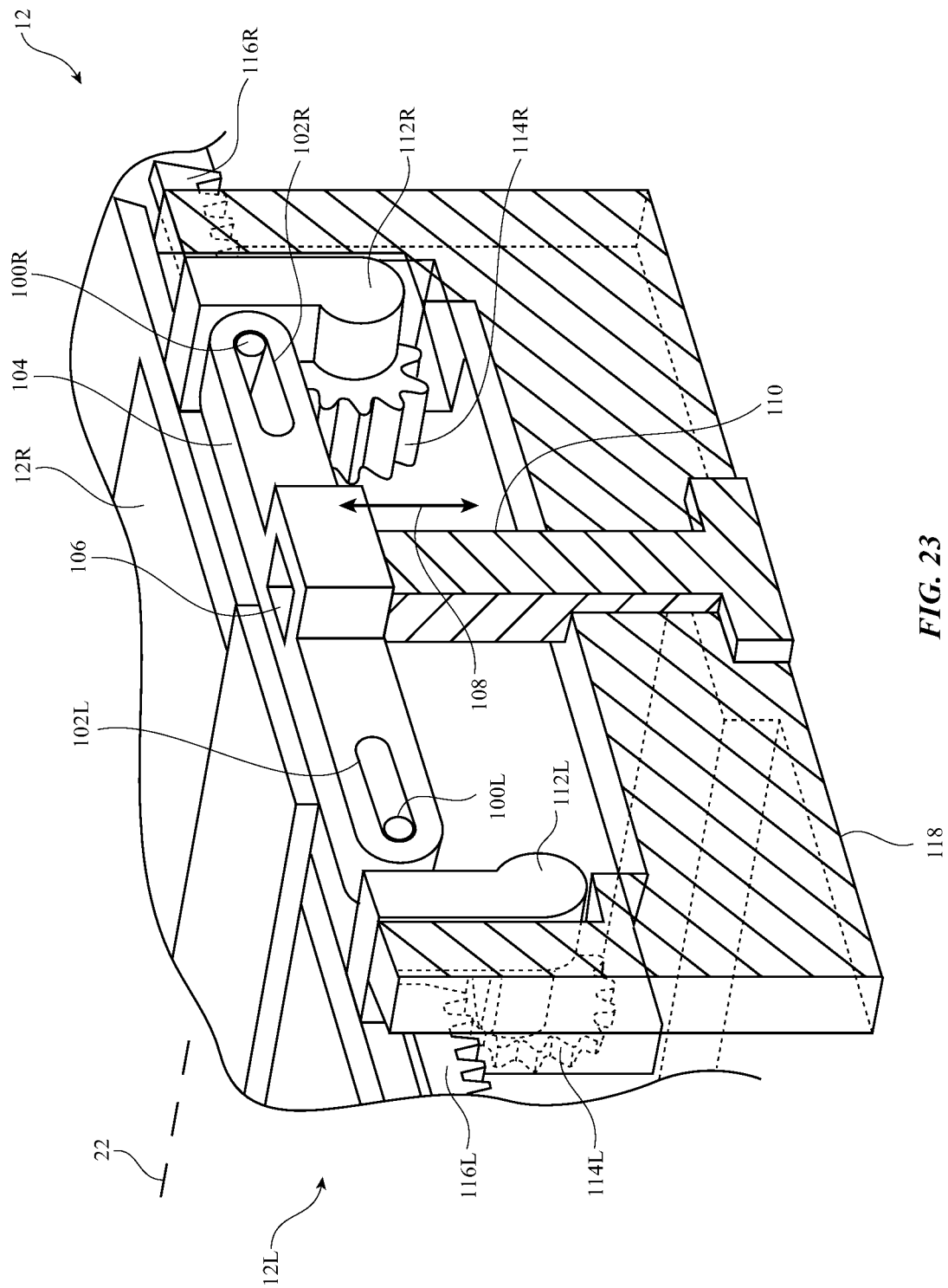
FIG. 23 is a perspective view of illustrative electronic device hinge structures in accordance with an embodiment.

As shown in FIG. 23, right-hand housing portion 12R may have a pin such as pin 100R that extends into slot 102R of sliding bar member 104 and may have teeth 116R that engage teeth 114R on right-hand gear member 112R. Housing 12 may also have a left housing portion 12L with a pin 100L that extends into left slot 102L and teeth 116L that engage teeth 114L on left gear member 112L.

Clamp 118 prevents gear members 112L and 112R from separating during folding and unfolding operations in which housing portions 12L and 12R are rotated about axis 22. Bar member 104 maintains a desired separation distance between gear members 112L and 112R during folding and unfolding. Bar member 104 has opening 106 that allows bar member 104 to slide up and down in directions 108 along vertical post 110 (e.g., a post coupled to clamp 118). As bar 104 moves down post 110, teeth 116L move around teeth 114L and teeth 116R move around teeth 114R (i.e., left flap and pin 100L walk around teeth 114L and the right flap and pin 100R walk around teeth 114R), thereby pivoting flaps 12F on the left and right of housing 12 away from each other. If desired, the teeth of FIG. 23 may be omitted (i.e., the mating surfaces may be smooth and free of teeth). The use of teeth is merely illustrative.

Figure 24:
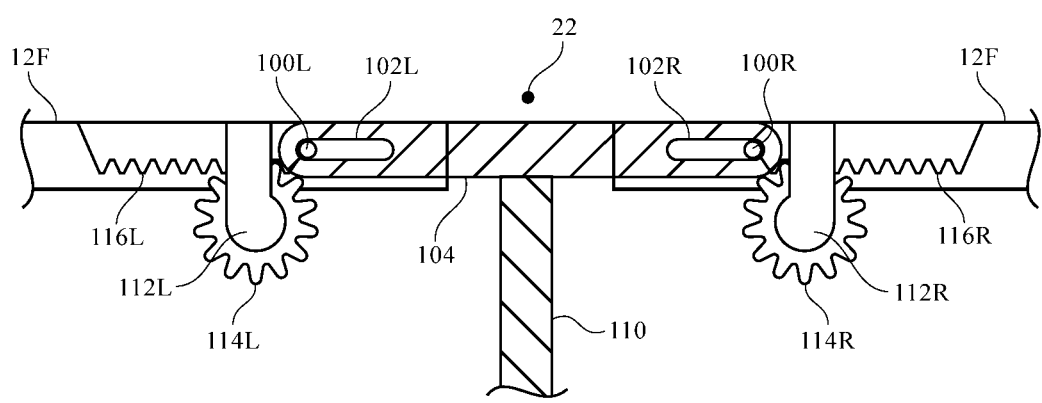
FIG. 24 is a cross-sectional side view of an illustrative electronic device with hinge structures of the type shown in FIG. 23 in an unfolded configuration in accordance with an embodiment.
Figure 25:
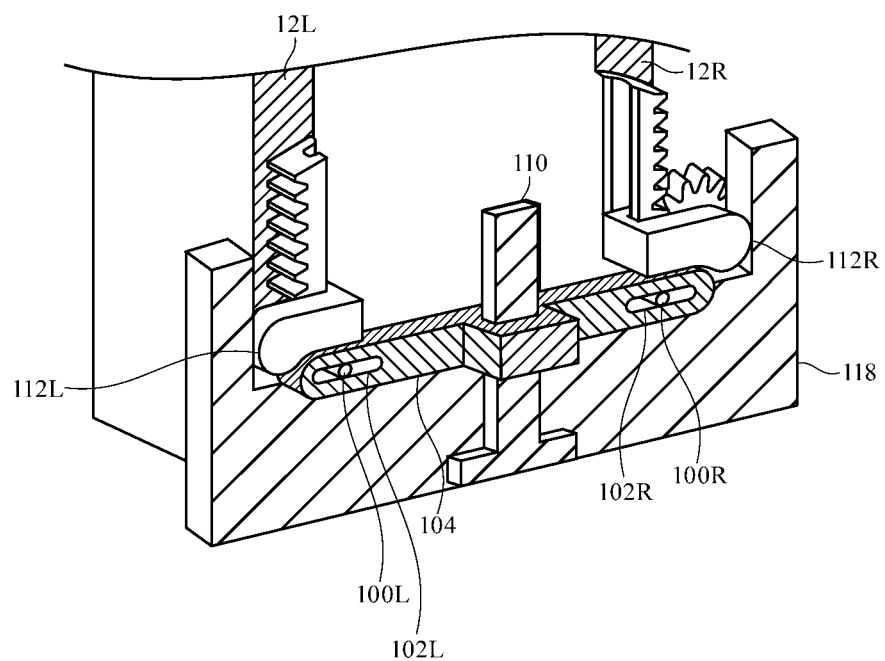
FIG. 25 is a cross-sectional side view of an illustrative electronic device with hinge structures of the type shown in FIG. 24 in a folded configuration in accordance with an embodiment.
Figure 26:
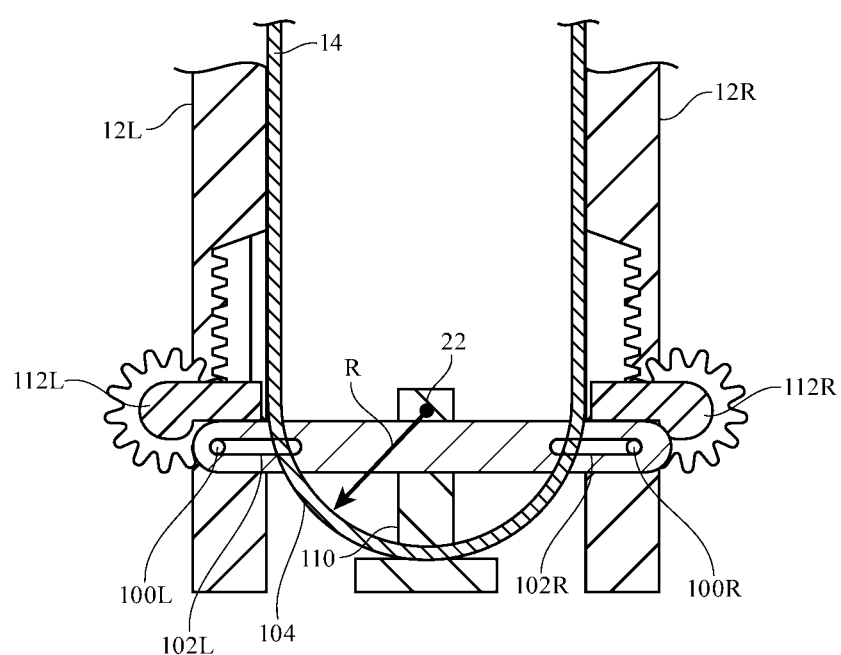
FIG. 26 is a cross-sectional side view of an illustrative electronic device with folded hinge structures and a bent flexible display in accordance with an embodiment.

A cross-sectional side view of housing 12 prior to folding of housing portions 12R and 12L relative to each other is shown in FIG. 24. As housing 12 is folded about axis 22, portions 12L and 12R will walk around gears 112L and 112R, respectively and will maintain a desired separation from each other (FIG. 25). This allows housing 12 to accommodate a folded display 14 with a desired minimum bend radius R, as shown in FIG. 26.

Figure 27:
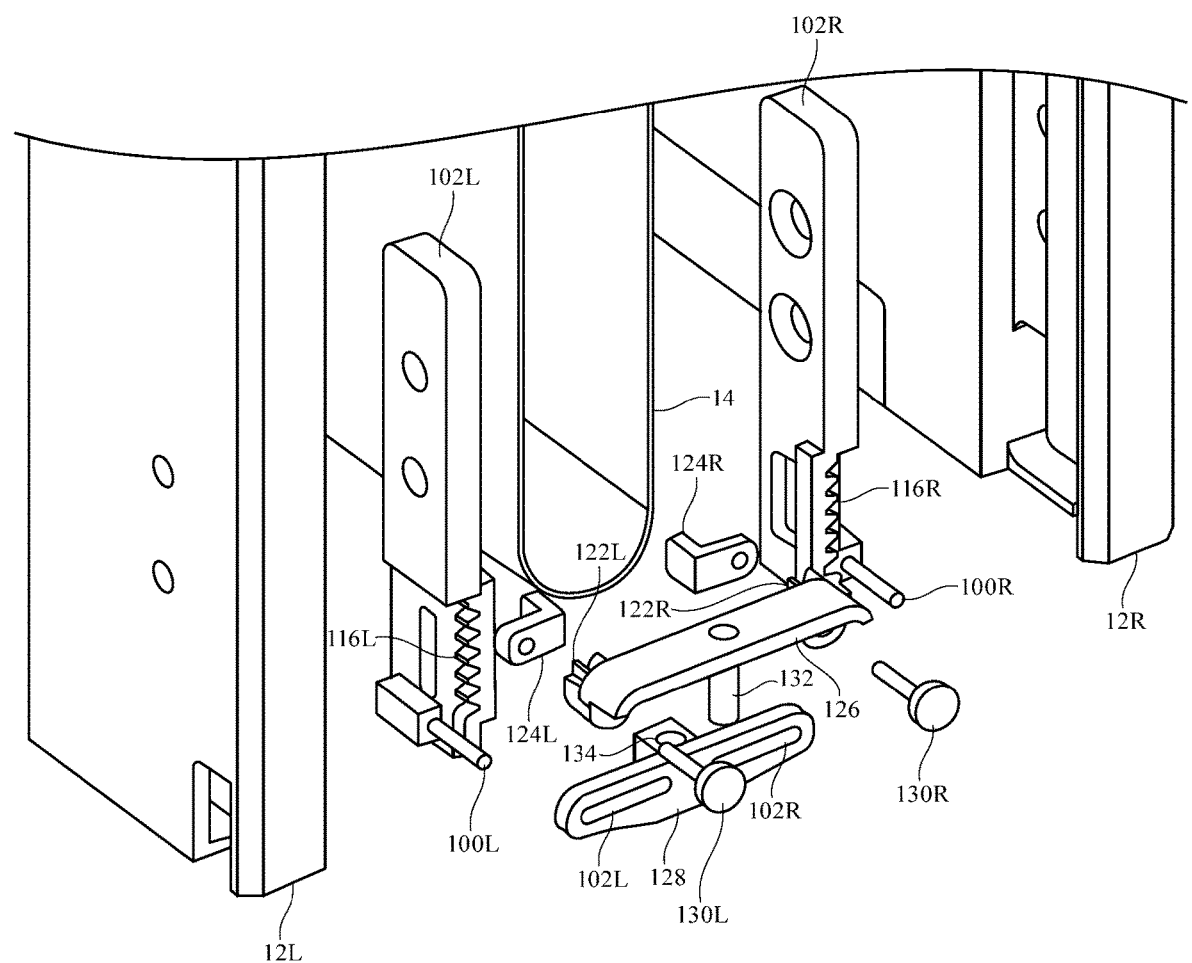
FIG. 27 is an exploded perspective view of illustrative hinge structures for an electronic device with a foldable display in accordance with an embodiment.

Another illustrative configuration for housing 12 that is based on a gear-and-rack arrangement is shown in the exploded perspective view of FIG. 27. As shown in FIG. 27, member 120L may have teeth 116L and may be attached to a planar housing structure to form left housing portion 12L. Member 120R may have teeth 116R and may be attached to a planar housing structure to form right housing portion 12R. Pin 100L may be received within slot 102L of slider member 128. Pin 100R may be received within slot 102R of slider member 128. Slider member 128 may have an opening such as opening 134 that receives steel pin 132 of base member 126. Base member 126 may be formed from a material such as metal (e.g., aluminum). Screw 130L may be received within an opening in clip 124L and may be used to mount gear 122L to base member 126. Screw 130R may be received within an opening in clip 124R and may be used to mount gear 122R to base member 126.

When in an unfolded state, housing portions 12L and 12R lie in a common plane and mate with each other along their edges. When in a folded configuration, the separation between gears 122L and 122R helps maintain a desired horizontal separation between housing portions 12L and 12R, thereby accommodating a bent flexible display such as display 14 of FIG. 27 without bending display 14 more tightly than desired.

FIG. 28 is a cross-sectional side view of device 10 in an arrangement that uses a rack-and-gear mechanism of the type shown in FIG. 27. In the configuration of FIG. 28, housing 12 is folded. In the configuration of FIG. 29, housing 12 is unfolded. FIG. 30 is a front view of housing 12 of FIG. 29 in the unfolded configuration. FIGS. 31 and 32 are detailed views of housing 12 in the vicinity of the bend axis in respective folded and unfolded configurations.

Figure 34:
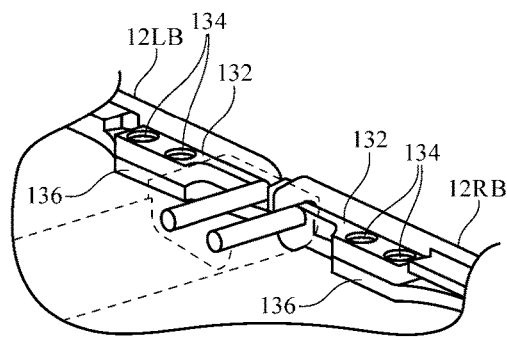
FIG. 34 is perspective view of illustrative hinge structures for the device housing of FIG. 33 in accordance with an embodiment.
Figure 33:
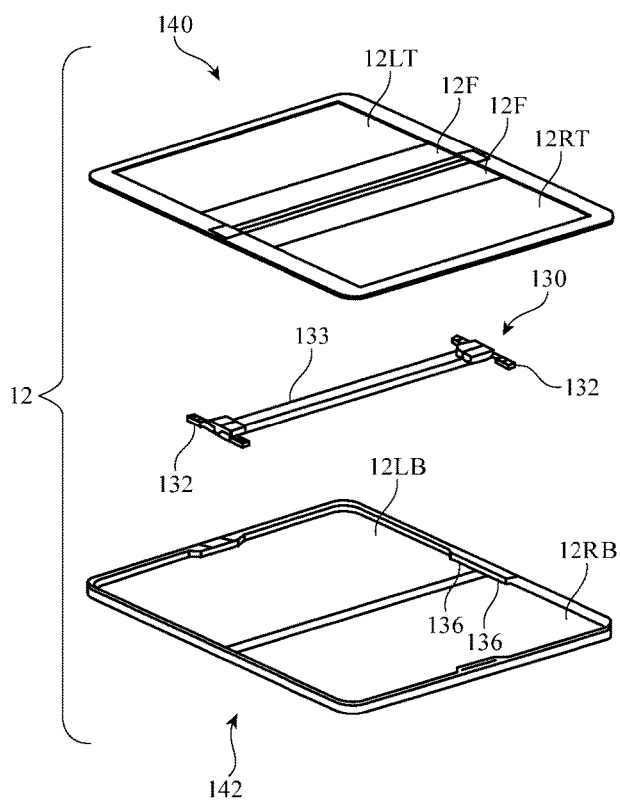
FIG. 33 is an exploded perspective view of an illustrative electronic device housing having movable flaps in accordance with an embodiment.
Figure 35:
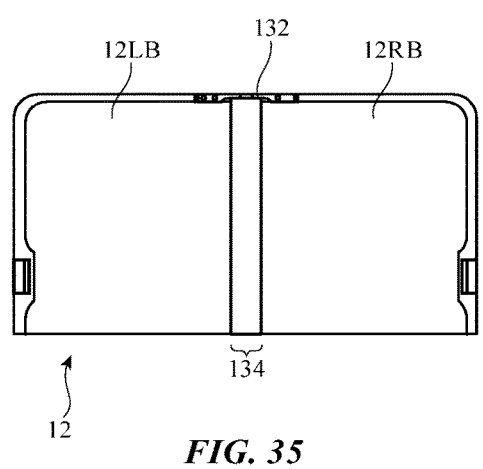
FIG. 35 is a front view of the device housing of FIG. 34 in accordance with an embodiment.

FIG. 33 is an exploded perspective view of an illustrative electronic device housing having movable flaps. The arrangement of FIG. 33 illustrates how a top down assembly technique may be used to construct device 10. As shown in FIG. 33, housing 12 may include top module 140 and lower module 142. Top module 140 may include left upper planar housing member 12LT (e.g., a left support plate), right upper planar housing member 12RT, and flaps 12F. Hinge module 130 may include gears and other linkages (i.e., structures 133) for coupling motion of the left and right halves of housing 12 and may include attachment members 132. Lower housing module 142 may include outer left housing member 12LB and outer right housing member 12RB. Mounting rails 136 may be coupled to lower housing module 142. During assembly operations, screws 134 may be used to mount attachment members 132 of hinge module 130 to mounting rails 136, as shown in FIG. 34. The resulting partly assembled housing for device 10 (housing 12) is shown in FIG. 35. Module 140 and display 14 may be mounted to the assembly of FIG. 35 to form device 10.

Figure 36:
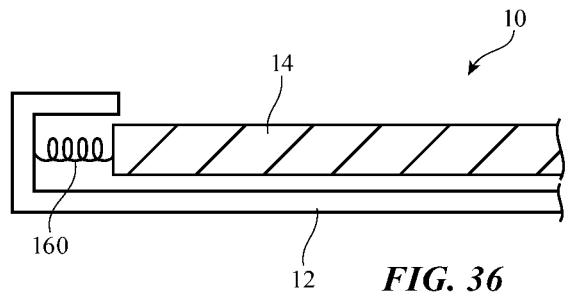
FIGS. 36, 37, and 38 are views of portions of a foldable electronic device having display biasing structures in accordance with an embodiment.
Figure 37:
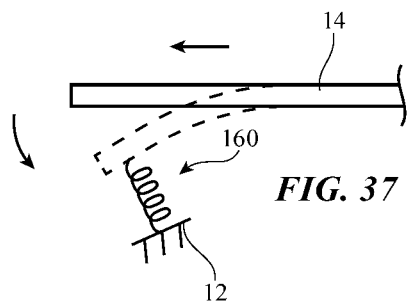
Figure 38:
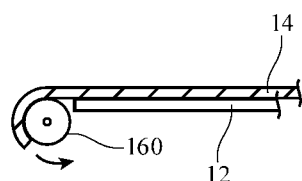

Flexible displays may contain materials that stretch over time, so it may be desirable to provide device 10 with biasing structures that help maintain display 14 in a planar state whenever housing 12 is unfolded. With one illustrative configuration, a spring or other biasing structure 160 of FIG. 36 may be used to stretch display 14 outward and thereby help ensure that display 14 is taut and flat during use. If desired, biasing structure 160 may be used to pull the edge of display 14 downward to and therefore outward to ensure that display 14 is taut (FIG. 37) or the biasing structure may be incorporated into a roller such as biasing roller 160 of FIG. 38 to pull display 14 outward to ensure that display 14 is taut.

Figure 39:
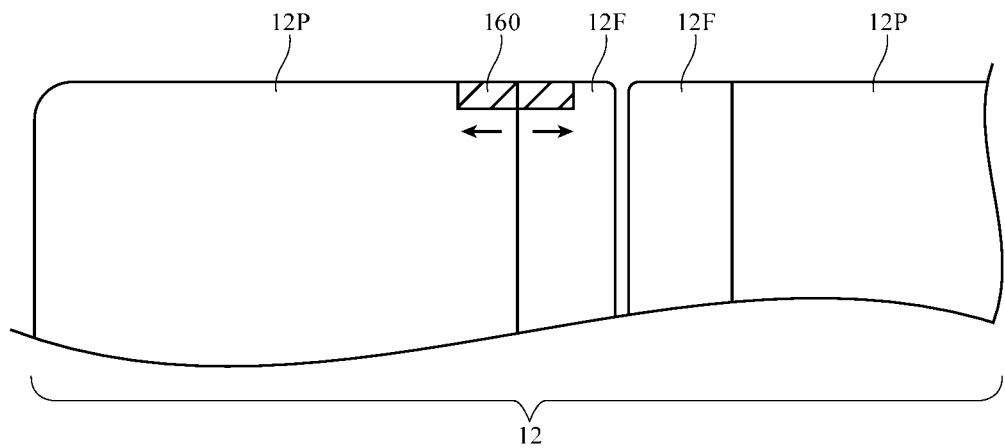
FIG. 39 is a front view of an illustrative device having a display biasing structure in accordance with an embodiment.
Figure 40:
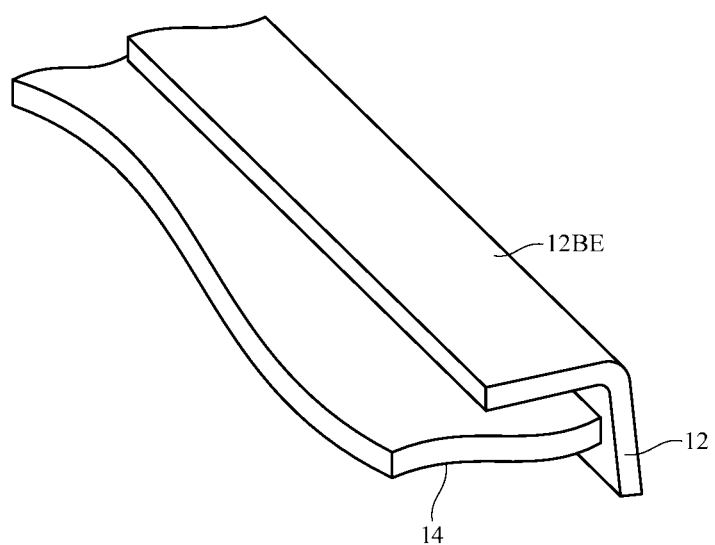
FIG. 40 is a perspective view of an illustrative protective rail structure to cover an edge portion of a flexible display in accordance with an embodiment.

In the illustrative configuration of FIG. 39, biasing structure 160 is being used to push flap 12F away from housing plate 12P so that display 14 (which is attached to housing plate 12P) is stretched taut. Biasing structures may be formed from spring metal, foam, elastomeric material, magnets, or other biasing structures. Other arrangements for biasing display 14 outward may be used if desired. Moreover, flattening layers such as a resilient backplate, biasing strips, a thin and highly elastic backing layer that helps counteract any plastic deformation in the layers of display 14, a frame with a spring mechanism, a mesh-shaped backing mechanism, bistable plates or strips to hold display 14 flat, and/or other structures may be used to enhance display flatness. The illustrative biasing mechanisms of FIGS. 36, 37, 38, and 39 are merely illustrative.

If desired, the edge of housing 12 may be provided with bezel structures such as bezel structure 12BE or other lip-shaped edge portion along the edge of housing 12 that helps hold down the edges of display 14 and helps reduce dust intrusion under display 14.

Figure 41:
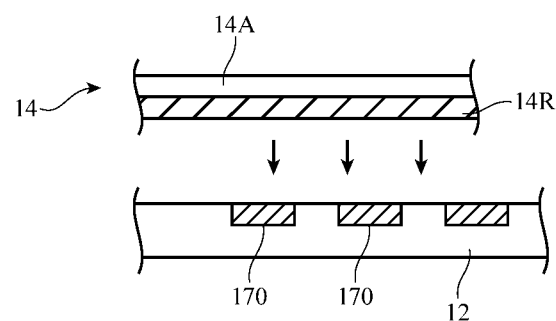
FIG. 41 is a cross-sectional side view of an illustrative electronic device having biasing structures such as magnets to help maintain display flatness in accordance with an embodiment.

FIG. 41 is a cross-sectional side view of display 14. Display 14 may have active layers 14A for displaying images. The side view of display 14 of FIG. 41 shows how the rear surface 14R of display 14 may be provided with a ferromagnetic material that is pulled by magnets 170 in housing 12 (e.g., to ensure that display 14 follows the retraction of flaps in housing 12, to hold display 14 in a planar configuration, etc.). This type of arrangement may help maintain display 14 in a desired configuration (e.g., flat when device 10 is unfolded, retracted when device 10 is bent, etc.).

Figure 42:
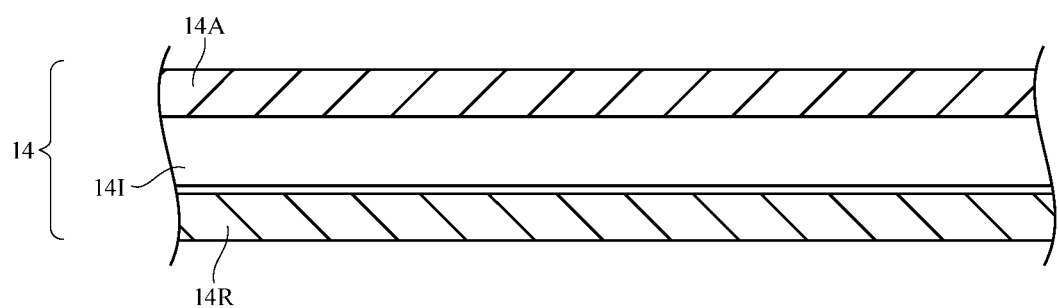
FIG. 42 is a cross-sectional side view of illustrative display layers to help prevent indentations in a flexible display in accordance with an embodiment.

In the example of FIG. 42, display 14 has been provided with intermediate layer 121 between rear layer 14R and active layer(s) 14A. Rear layer 14R of FIG. 42 may be a support layer that helps hold display 14 flat (e.g., a thin layer of metal, a polymer layer that resists deformation, etc.). Intermediate layer 141 may be used to help prevent deformation of display 14 when display 14 is exposed to an undesired impact from an object. Layer 141 may include, for example, one or more layers of protective material such as foam, elastomeric polymer, a thin steel layer or other metal layer, etc.

Figure 43:
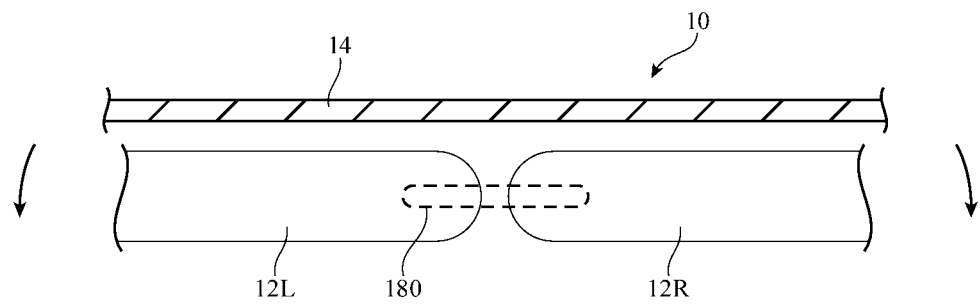
FIG. 43 is a cross-sectional side view of an illustrative device having rounded hinge structures in accordance with an embodiment.
Figure 44:
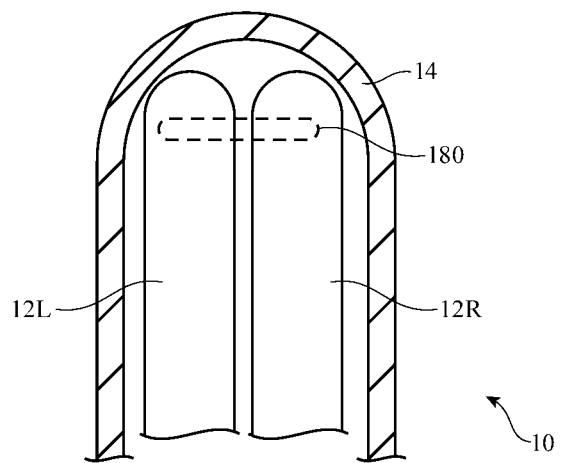
FIG. 44 is a cross-sectional side view of the illustrative device of FIG. 43 showing how the hinge structures of FIG. 43 allow the device to be folded outwardly to expose a flexible display on the outer surfaces of the device in accordance with an embodiment.

In arrangements in which the outer surfaces of housing portions 12L and 12R have curved shapes of the type shown in FIG. 43, it is possible to fold housing 12 outwardly while preserving a desired separation between the housing portions (i.e., a separation that does not cause display 14 to stretch or buckle), as shown in FIG. 44. Linkage 180 may be a pin and slot linkage, a biasing structure such as a spring, a rack-and-gear structure, or other suitable linkage for coupling housing portions 12L and 12R together while allowing housing portions 12L and 12R to be moved between the open (unfolded) configuration of FIG. 43 and the outwardly folded configuration of FIG. 44. If desired, device 10 of FIGS. 43 and 44 may also be folded inwardly.

Figure 45:
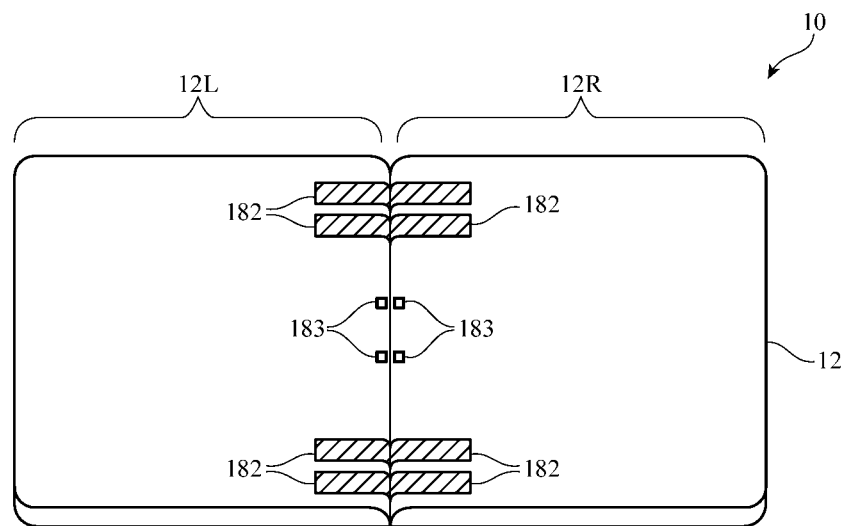
FIG. 45 is a perspective view of an illustrative foldable electronic device in accordance with an embodiment.

FIG. 45 is a perspective view of an illustrative electronic device with a foldable housing. Display 14 is not shown in FIG. 45. Left and right housing portions 12L and 12R may have curved mating surfaces of the type shown in FIGS. 43 and 44 (as an example). As shown in FIG. 45, circuitry in the left and right portions of housing 12 may be coupled using flexible printed circuits 182. Magnets 183 may be used to help hold left and right housing portions 12L and 12R together. Magnets 183 may, for example, include pairs of magnets, each pair having a left-hand magnet on portion 12L and a mating right-hand magnet at an opposing location on portion 12R.

Figure 46:
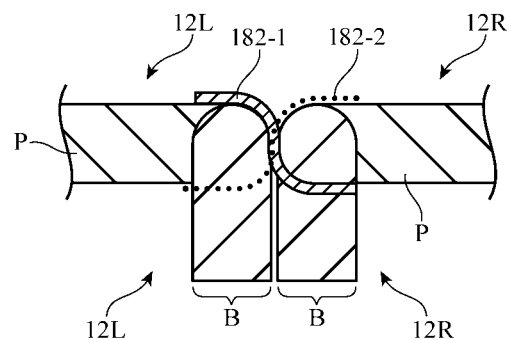
FIG. 46 is a cross-sectional side view of hinge portions of the foldable device of FIG. 45 showing how signal paths formed in flexible printed circuits or other signal path structures may bend during folding and unfolding of the device in accordance with an embodiment.

FIG. 46 is a cross-sectional side view of the hinge region of device 10 of FIG. 45 showing how some of the flexible printed circuits such as flexible printed circuit 182-1 may extend from the upper surface of left housing portion 12L to the lower surface of adjacent portions of right housing portion 12R and how other flexible printed circuits such as flexible printed circuit 182-2 may extend from the lower surface of left housing portion 12L to the upper surface of right housing portion 12R. Printed circuits 182 may contain signal lines for routing signals between the circuitry of the left and right housings and/or may serve as a mechanical hinge structure for device 10. The layout of printed circuits 182-1 and 182-2 allows left and right portions 12L and 12R respectively to be placed in either planar (unfolded) position P or bent (folded) position B without stretching the printed circuits.

Figure 47:
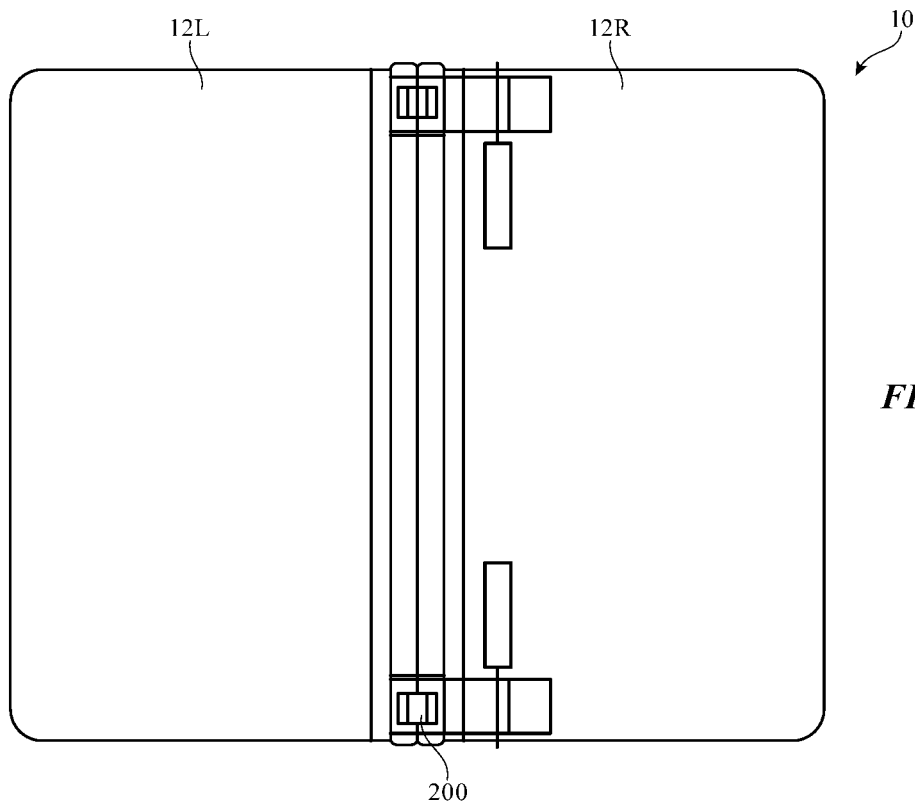
FIG. 47 is a front view of an illustrative electronic device in accordance with an embodiment.
Figure 48:
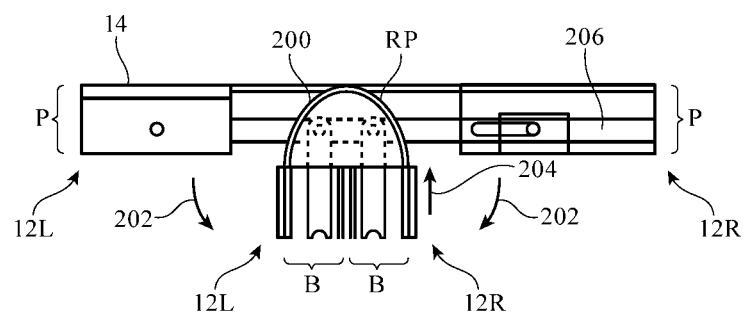
FIG. 48 is a side view of the device of FIG. 47 showing how a display support structure may be moved outwardly when the device is folded in accordance with an embodiment.
Figure 49:
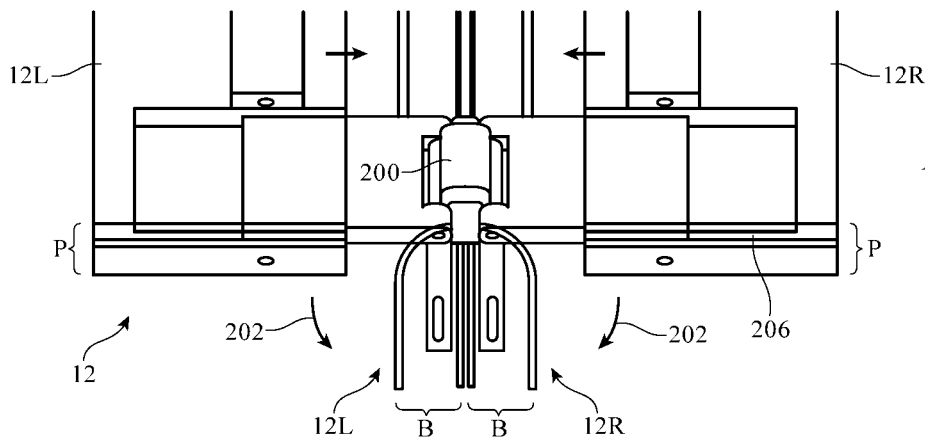
FIG. 49 is a perspective view of the electronic device of FIGS. 47 and 48 in accordance with an embodiment.

FIG. 47 is a front view of an illustrative electronic device having a hinge structure that protrudes and retracts as a function of the folding state of housing 12. When housing 12 is in the unfolded configuration of FIG. 47, retractable hinge portion 200 is retracted and lies flat with the planar front surface of housing 12, as shown by retracted position RP of portion 200 in FIG. 48. As left portion 12L and right portion 12R of housing 12 are bent in directions 202 from planar positions P to bent positions B, portion 200 advances outwardly in direction 204 to support display 14, which lies on the exposed outer surface of device 10. During bending, portions 12L and 12R compress spring plate 206. When unbent, the spring plate may help flatten display 14. FIG. 49 is a perspective view of a portion of device 10 in an illustrative configuration in which housing 12 has a retractable hinge portion such as portion 200 of FIGS. 47 and 48.

Figure 50:
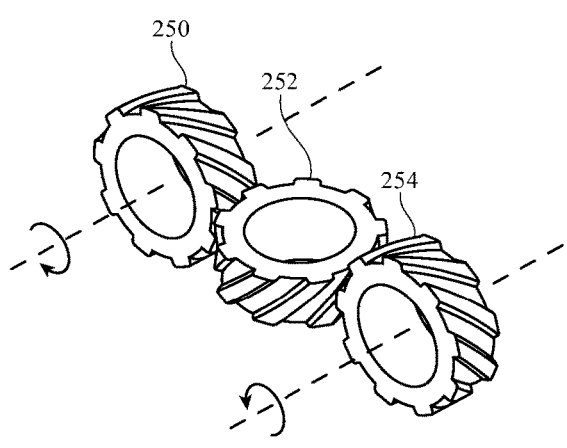
FIGS. 50 and 51 are perspective views of illustrative gear-based structures for coupling housing portions together in a foldable device in accordance with an embodiment.
Figure 51:
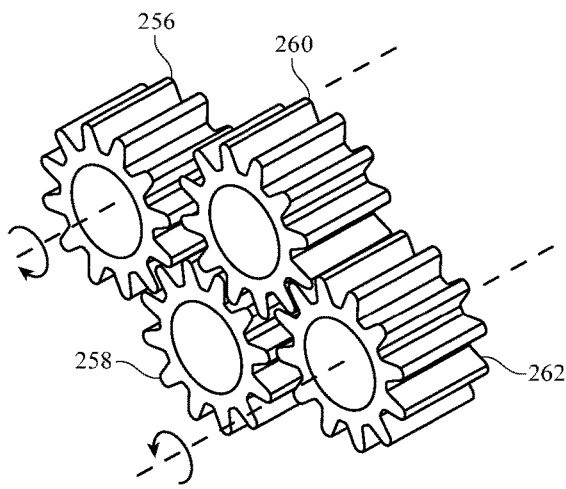

In general, any suitable coupling mechanism may be used to couple motion of the first and second portions of the housing of foldable device 10 when device 10 is bent. In the example of FIG. 19, gear 80L is coupled to left housing portion 12L and gear 80R is coupled to right housing portion 12R and helical gear 82 is used to couple gears 80R and 80L together. The teeth on gears 80R and 80L may be helical, as shown by illustrative helical gears 250 and 254 of FIG. 50 (i.e., gears 250, 252, and 254 of FIG. 50 may serve respectively as gears 80L, 82, and 80R of FIG. 19). As shown in FIG. 50 this type of coupling mechanism ensures that clockwise motion of gear 250 (i.e., inward bending of the left housing portion) will result in associated counterclockwise motion of gear 254 (i.e., inward bending of the right housing portion). If desired, other configurations may be used for the mechanism that couples the left and right housing portions. An illustrative four gear arrangement is shown in FIG. 51. The system of FIG. 51 includes spur gears 256, 258, 260, and 262. The teeth on gear 256 engage the teeth on gear 258. The teeth on gear 258, in turn, engage the teeth on gear 260, whose teeth engage the teeth on gear 262. Gear 256 may be connected to left housing portion 12L and gear 262 may likewise be coupled to right housing portion 12R, so that clockwise motion of gear 256 (i.e., inward bending of the left housing) will result in counterclockwise motion of gear 262 (i.e., inward bending of the right housing). The examples of FIGS. 50 and 51 are merely illustrative. Any suitable mechanism may be used to couple motion of the left and right housing portions of housing 12.

Figure 52:
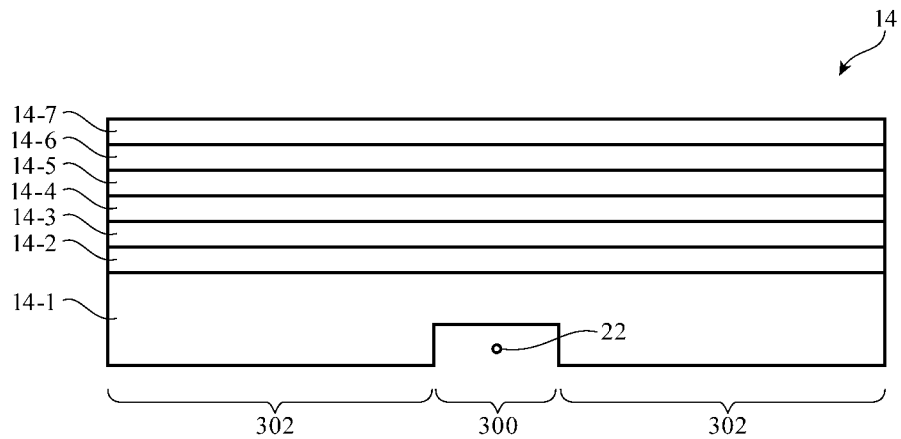
FIG. 52 is a cross-sectional side view of an illustrative flexible display in accordance with an embodiment.

FIG. 52 is a cross-sectional side view of an illustrative flexible display of the type that may be used in device 10. As shown in FIG. 52, display 14 may include a supporting layer such as backplate 14-1. Backplate 14-1 may be formed from a thin stiff material to help display 14 resist indentations and other damage during use in device 10 (e.g., damage from impact events) while allowing display 14 and device 10 to fold and unfold about bend axis 22. As an example, backplate 14-1 may be formed from one or more layers of plastic, carbon-fiber composite material or other fiber composites, metal, or other materials. Backplate 14-1 may have a thickness that is thinner in bend region 300 than in edge regions 302 or that contains recesses or other structures to enhance flexibility of backplate 14-1 in region 300. Bend region 300 may overlap and run along bend axis 22 for device 10. Backplate 14-1 may be formed from a material that helps spread heat generated by light-emitting diode pixels in display 14 (e.g., backplate 14-1 may be formed from a material with a high thermal conductivity such as metal).

Adhesive layer 14-2 (e.g., pressure sensitive adhesive) may be used to attach flexible organic light-emitting diode display 14-3 to backplate 14-1. Adhesive layer 14-4 (e.g., an optically clear adhesive) may be used to attach flexible touch sensor 14-5 to display 14-3. Touch sensor 14-5 may be a capacitive touch sensor having an array of capacitive touch sensor electrodes formed on a substrate such as a flexible polymer sheet. Adhesive layer 14-6 may be used to attach polarizer and functional layer 14-7 to touch sensor layer 14-5. Layer 14-7 may include a polymer polarizer film and optional coating layers (e.g., a scratch resistant inorganic coating, which may sometimes referred to as a hard coat), a smudge resistant coating, antireflection coating material, etc.

Figure 53:
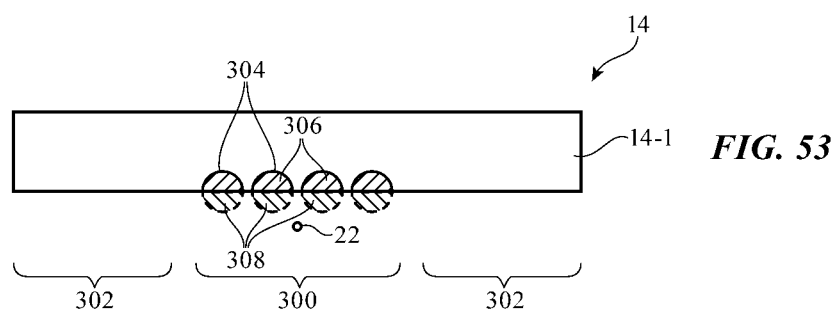
FIG. 53 is cross-sectional side view of an illustrative flexible display with flexibility enhancement structure such as parallel grooves in a backplate layer in accordance with an embodiment.
Figure 54:
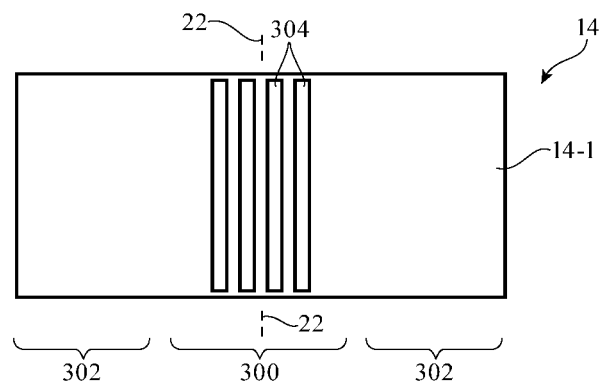
FIG. 54 is a top view of the illustrative flexible display backplate layer of FIG. 53 in accordance with an embodiment.
Figure 55:
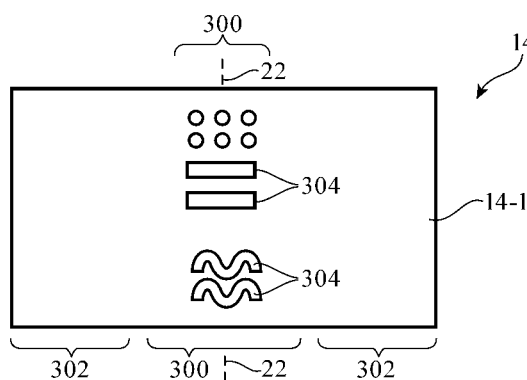
FIG. 55 is a top view of an illustrative flexible display layer such as a backplate layer having flexibility enhancement recesses of various patterns in accordance with an embodiment.

FIG. 53 shows how recesses such as elongated grooves 304 that run parallel to axis 22 may be formed in bend region 300 of backplate 14-1 to locally reduce the stiffness of backplate 14-1. If desired, elastomeric polymers or other flexible materials such as material 306 and optional additional material 308 may be formed in and/or on grooves 304 or other recesses in backplate 14-1 to help provide structural support while allowing backplate 14-1 to maintain enhanced flexibility in region 300 relative to regions such as regions 302 that do not contain flexibility-enhancing recesses in backplate 14-1. FIG. 54 is a top view of grooves 304 of FIG. 53. FIG. 55 shows how recesses 304 in bend region 300 may have the shapes of spots, slots that run perpendicular to axis 22 and bend region 300, serpentine grooves, etc. In general, recesses in backplate 14-1 and/or any other layers in display 14 may have these shapes, other shapes, or combinations of shapes.

Figure 56:
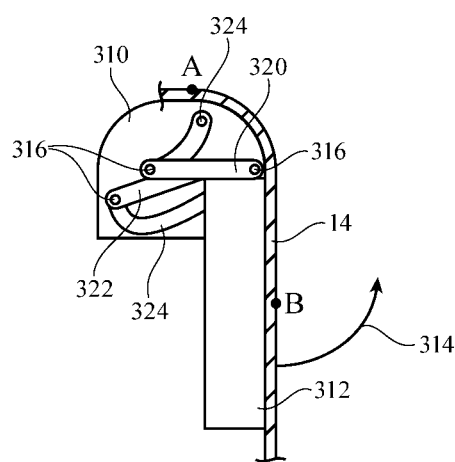
FIGS. 56 and 57 are cross-sectional side views of illustrative hinge structures with a dual axis linkage in accordance with an embodiment.
Figure 57:
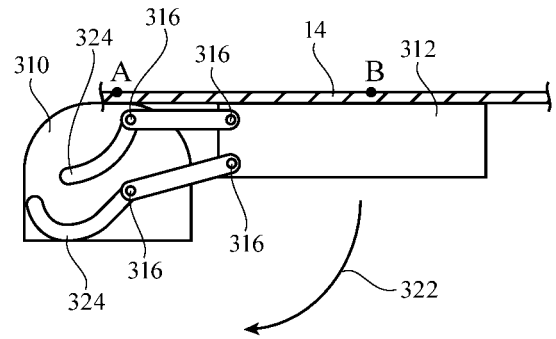
Figure 58:
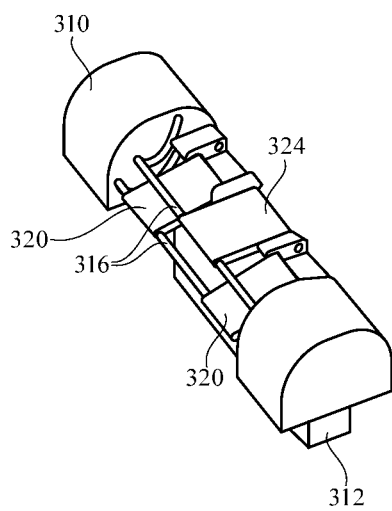
FIG. 58 is a perspective view of an illustrative dual axis linkage hinge in a bent (folded device) configuration in accordance with an embodiment.
Figure 59:
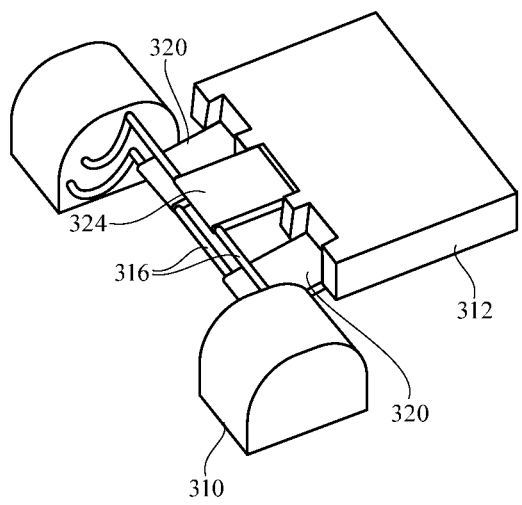
FIG. 59 is a perspective view of the illustrative hinge of FIG. 58 in a straight (unfolded device configuration in accordance with an embodiment).

If desired, the hinge for folding device 10 may be formed using a linkage with multiple axes. An illustrative hinge mechanism with two rotational axes (i.e., two rotational axis for each half of the hinge to accommodate left and right housing portions in housing 12) is shown in FIGS. 56, 57, 58, and 59. As FIGS. 56 and 57 are cross-sectional side views of a hinge linkage (e.g., a right-hand portion of a hinge) with two axes. FIG. 56 shows the hinge mechanism in the closed state and FIG. 57 shows the hinge mechanism in the open state. As shown in FIG. 56, the linkages of the hinge may have hinge members such as hinge block 310 that are coupled to hinge members such as hinge plates 312 by linkage members 320 and 322. Linkage members 320 and 322 have holes that receive rods 316. The ends of rods 316 move within linkage grooves 324 in hinge blocks 310. This allows plate 312 of FIG. 56 (e.g., the right portion of housing 12 in this example) to move outwardly in direction 314 of FIG. 56 (e.g., to place the hinge in the open hinge state of FIG. 57 so that device 10 is unfolded) and inwardly in direction 322 of FIG. 57 (e.g., to place the hinge in the closed hinge state of FIG. 56 so that device 10 is in a folded configuration). In bending device 10 open and closed in this way, display 14 experiences relatively small amounts of stress (i.e., the distance along the surface of display 14 between points A and B in FIGS. 56 and 567 does not change appreciably between the open and closed states due to the use of the dual axis linkages formed using pairs of rods 316 and associated grooves 324. FIGS. 58 and 59 are perspective views of the dual-axis (two rod) hinge linkage mechanism of FIGS. 56 and 57 in closed and open states, respectively.

Figure 60:
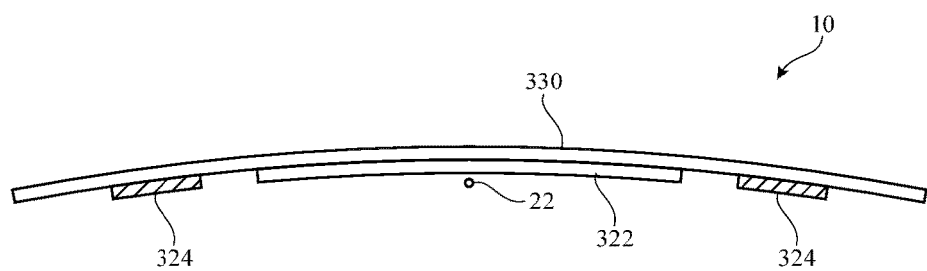
FIGS. 60 and 61 are cross-sectional side views of a foldable device showing how lateral movement in flexible layers such as flexible display layers may be dynamically adjusted to prevent bulging in accordance with an embodiment.
Figure 61:
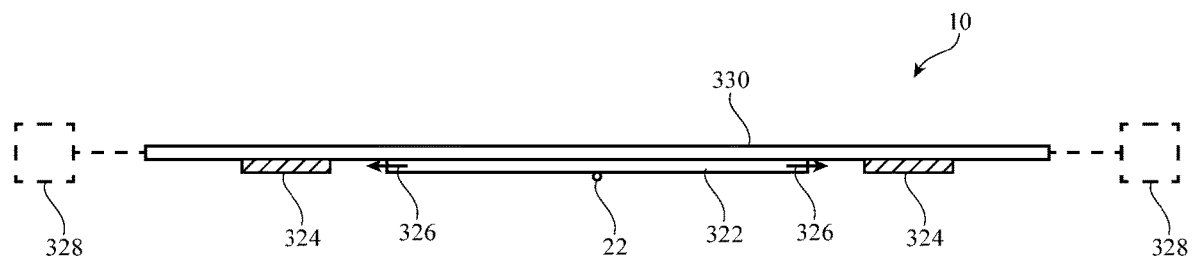

FIGS. 60 and 61 are cross-sectional side views of a foldable device showing how lateral movement in flexible layers such as flexible display layers may be dynamically adjusted. Flexible layer 330 may be a flexible structure in device 10 such as a flexible display layer (e.g., backplate 14-1 of FIG. 52 or other display layer or support layer). Strain sensors such as strain sensors 324 may be used to detect changes in the strain in layer 330 (e.g., bending stress remaining in layer 330 after device 10 has been folded and unfolded, etc.). Strain sensors 324 may be thin-film strain gauges (e.g., strain gauges embedded in organic light-emitting diode layer 14-3 of FIG. 52, strain gauges embedded in touch sensor layer 14-5 of FIG. 52, or formed on other layers in display 14 or device 10), piezoelectric strain gauges attached to a backplate or other display layer, or other suitable strain gauges. When stress is detected, control circuitry in device 10 can take appropriate action. For example, an embedded actuator such as piezoelectric actuator 322 may be directed to move laterally outwards in directions 326, thereby flattening out layer 330 as shown in FIG. 61. If desired, electromagnetic actuators (e.g., solenoids), piezoelectric actuators, motors, or other actuators may be located at one or both ends of layer 330 (see, e.g., actuators 328 of FIG. 61) and may be electronically controlled to pull on layer 330 in directions 326 to flatten layer 330 and thereby prevent bulging in layer 330.

If desired, device 10 may have biasing structures such as compression springs that help stretch display 14 into a flat configuration. This type of arrangement is illustrated in the cross-sectional side views of device 10 of FIGS. 62 and 63.

Figure 62:
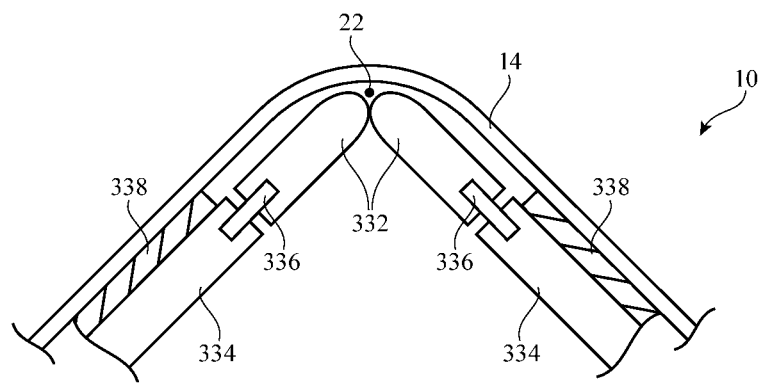
FIGS. 62 and 63 are cross-sectional side views of a foldable device in partly folded and open configurations in accordance with an embodiment.
Figure 63:
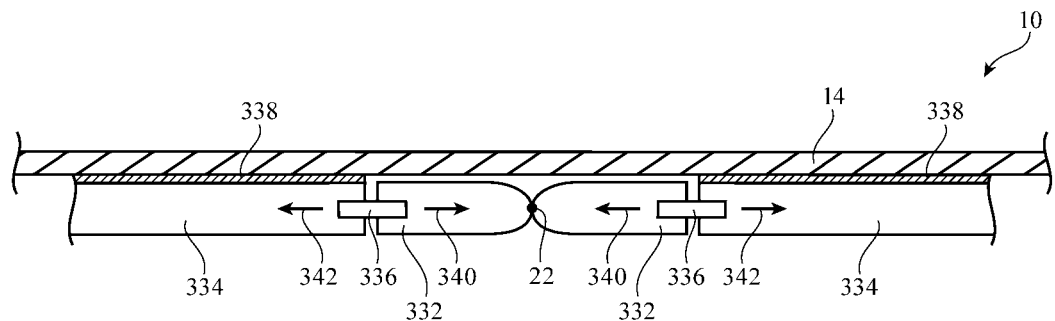

FIG. 62 shows how flexible display 14 may be attached to support structures such as edge support plates 334 using pressure sensitive adhesive layers 338 (as an example). Inner support members 332 may have curved mating surfaces (i.e., rounded edges) that allow these structures to press against each other and to rotate relative to each other as device 10 is being folded and unfolded about bend axis 22. Compression springs 336 or other biasing structures may push members 332 against each other and away from outer support structures such as edge support plates 334. This ensures that display 14 will be held taught and will be free of bulges. As shown in FIG. 63, for example, springs 336 will push members 332 inwardly against each other in directions 340 while pushing edge support plates 334 outwardly away from members 332 in directions 342. This pulls the ends of display 14 in directions 342 and helps flatten display 14.

Figure 64:
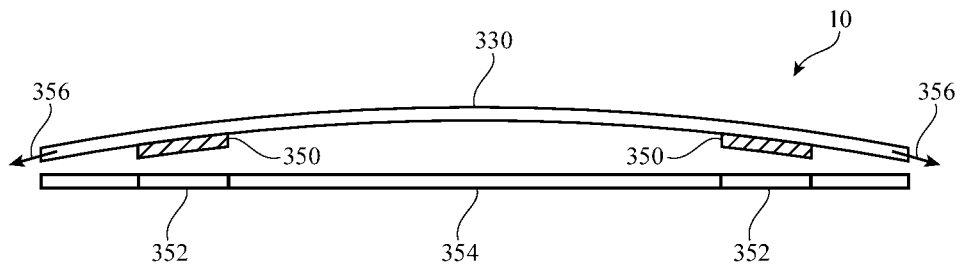
FIGS. 64 and 65 are cross-sectional side views of a foldable device showing how biasing structures such as magnets may help flatten a flexible display in accordance with an embodiment.
Figure 65:
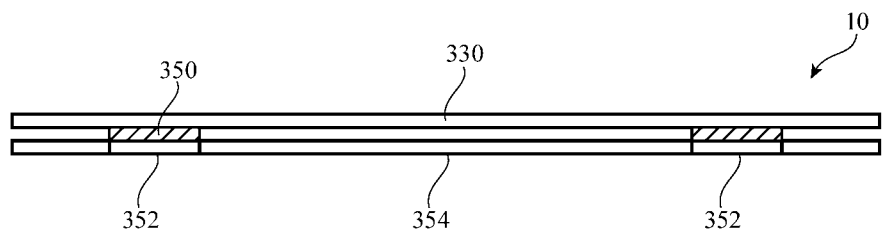

FIGS. 64 and 65 are cross-sectional side views of foldable device 10 in an illustrative configuration in which biasing structures such as magnets 350 and 352 are used to bias display 14 outwardly in directions 356 and thereby tighten and flatten display 14. Magnets 350 may be attached to the underside of display layer 330 (e.g., backplate 14-1, a stiffener, or other support structure, etc.). Corresponding magnets 352 may be attached to support structure 354 (e.g. part of housing 12, an internal support structure that is coupled to housing 12, etc.). Magnets 352 pull magnets 350 outwardly in directions 356, so that display layer 330 is flat when device 10 is in an unfolded configuration of the type shown in FIG. 65.

Figure 66:
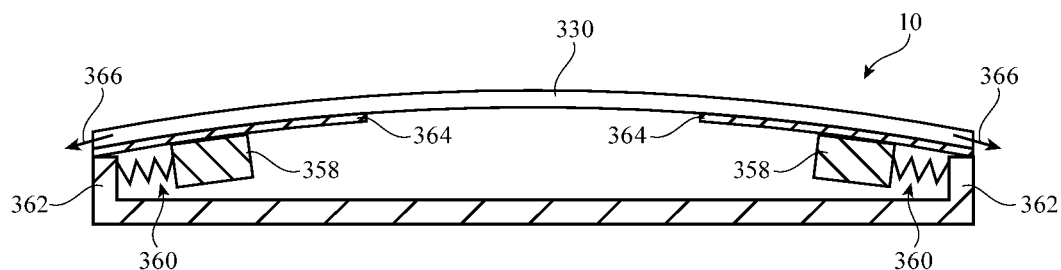
FIGS. 66 and 67 are cross-sectional side views of a foldable device showing how biasing structures such as springs may help flatten a flexible display in accordance with an embodiment.
Figure 67:
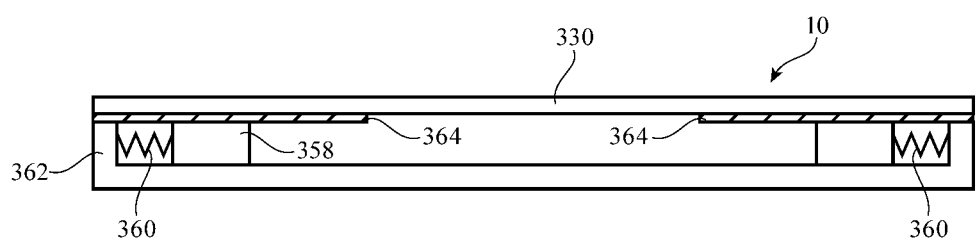

FIGS. 66 and 67 are cross-sectional side views of foldable device 10 in an illustrative configuration in which springs 360 are used to help bias display 14 outwardly in directions 366 and thereby tighten and flatten display 14. Display 14 may include, for example, one or more display layers such as display layer 330 (e.g., backplate 14-1). Flexible display stiffening plates 364 may be attached to the lower surfaces of layer 330 (e.g., adhesive may be used to attach plates 364 to the outer edges of layer 330 at opposing ends of device 10). Spring support structures 358 may be used to attach an inner ends of springs 360 to stiffening plates 364. An opposing outer end of each of springs 360 may be attached to a housing structures or other support structure (see, e.g., structures 362). When springs 360 are stretched due to a bulge in layer 330, springs 360 will tend to contract, thereby pulling stiffening plates 364 in outward directions 366. As shown in FIG. 67, this will tend to flatten layer 330 and therefore flatten display 14.

Figure 68A:
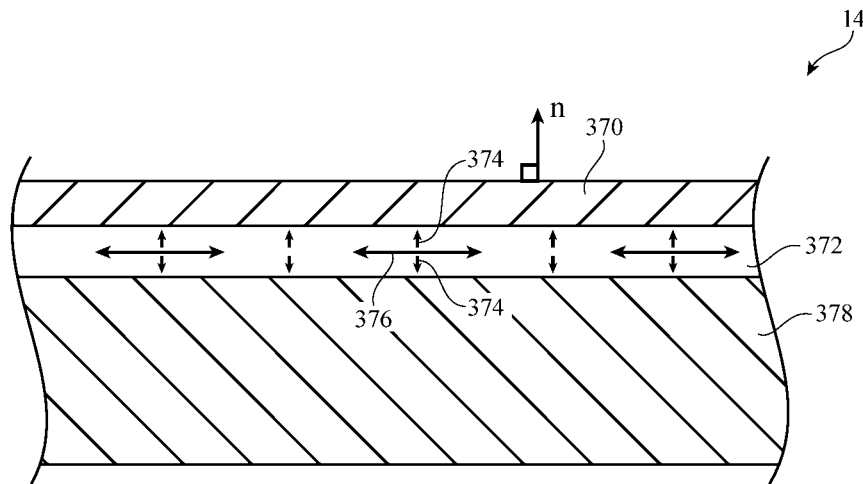
FIGS. 68A and 68B are cross-sectional side views of a portion of an illustrative electronic device showing how pressure sensitive adhesive that stretches preferentially along a dimension that is perpendicular to a surface normal for a flexible display may prevent bulging in accordance with an embodiment.
Figure 68B:
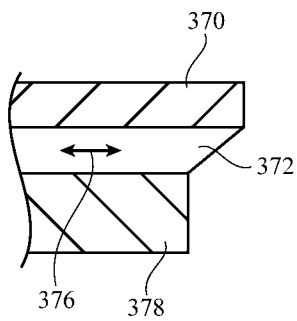

FIGS. 68A and 68B are cross-sectional side views of a portion of electronic device 10 in an illustrative configuration in which flexible display layer (flexible display) 370 has been attached to device structures 378 (e.g., a flap such as flap 12F of FIG. 9, a support plate that may or may not be associated with a flap, a fixed or stationary portion of housing 12, or other supporting structure) using pressure sensitive adhesive 372. Display layer 370 may a layer such as one of the layers of display 14 of FIG. 52 (as an example). Device structures 378 may be another layer in display 14 or may be a supporting structure such as flap 12F).

Pressure sensitive adhesive 372 may stretch preferentially in direction 376 of FIG. 68A (i.e., adhesive 372 may not stretch in direction 374, which is parallel to the surface normal n of layer 370, but may stretch in directions 376, which is perpendicular to surface normal n of layer 370 and which may run perpendicular to bend axis 22 when device 10 is folded). As a result, the edge of layer 370 may protrude over the edge of layer 378 after device 10 is folded around bend axis 22, thereby stretching adhesive 372 in directions 376 (FIG. 68B). This type of arrangement may help maintain display 14 attached to flat structures in device 10 (e.g., flaps 12F, etc.) and may help to relieve interlayer stresses in display 14 and stresses between a flexible display layer and flaps or other rigid support structures when display 14 is stretched by bending display 14 about axis 22.

Figure 69:
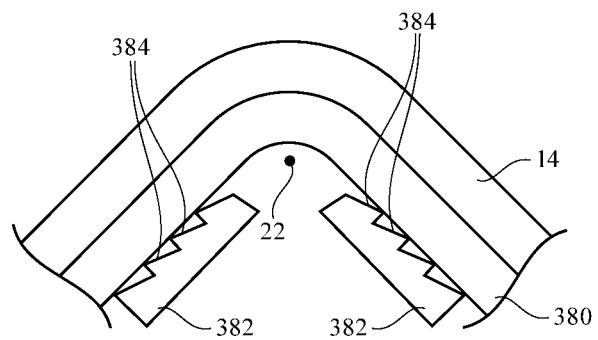
FIG. 69 is a cross-sectional side view of a portion of an illustrative electronic device showing how flaps or other structures in a foldable device may have unidirectional teeth to help remove slack from the bending region of a flexible display and thereby tighten the display in accordance with an embodiment.

FIG. 69 shows how a unidirectional sliding mechanism may be used to help prevent bulges in display 14. Initially, display 14 may be in a flat configuration (i.e., an unfolded device configuration). Display 14 may be supported by elastomeric layer 380. One-way teeth 384 on flaps or other support structures in the vicinity of bend axis 22 may selectively engage elastomeric layer 380. During folding operations, teeth 384 or other one-way sliding structures tend to engage elastomeric layer 380 and therefore pull display 14 outwardly to tighten display 14 and remove bulges from display 14. During unfolding operations, teeth 384 or other one-way sliding structures may slip past the surface of elastomeric layer 380, thereby allowing display 14 to lie flat. Biasing structures may pull the ends of display 14 outwardly to further flatten display 14. Unidirectional sliding mechanisms such as the illustrative structures of FIG. 69 may be used in conjunction with displays having layers attached to each other and/or to support structures using pressure sensitive adhesive of the type described in connection with FIGS. 68A and 68B.

Figure 70:
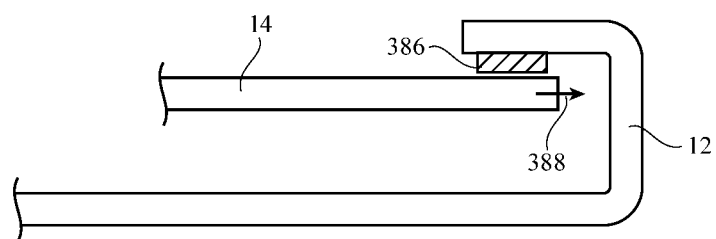
FIG. 70 is a cross-sectional side view of a portion of an illustrative electronic device showing how a foam biasing member may be used to pull an edge of a flexible display outwards to help flatten the display in accordance with an embodiment.

FIG. 70 is a cross-sectional side view of a portion of electronic device 10 in a configuration in which foam biasing member (foam) 386 serves as an outwardly biasing structure that pulls display 14 outwardly in direction 388 relative to housing 12 and thereby helps maintain display 14 in a flat configuration.

Figure 71:
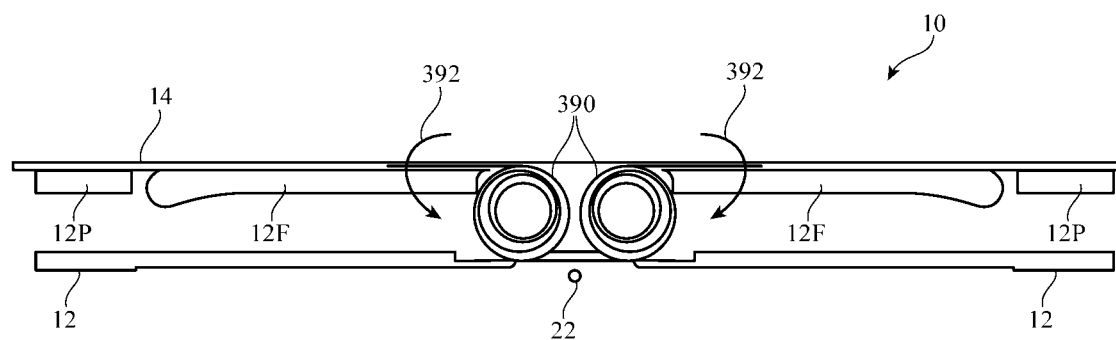
FIG. 71 is a cross-sectional side view of an illustrative electronic device showing how a biasing structure such as a torsion spring may be used to apply rotational force to flaps or other structures in an electronic device to flatten a display in accordance with an embodiment.

FIG. 71 is a cross-sectional side view of electronic device 10 in an illustrative configuration in which flaps 12F have been biased for rotational motion in directions 392 by biasing structures such as coil springs 390 or other springs. This motion (i.e., the rotational force that biases flaps 12F away from display 14) tends to remove bulges from display 14 and thereby flatten display 14.

Figure 72:
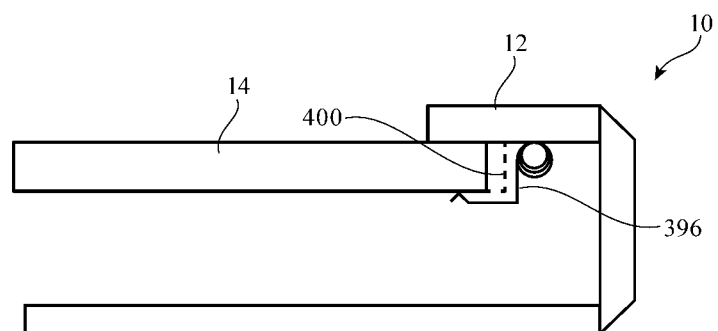
FIG. 72 is a cross-sectional side view of an illustrative electronic device showing how a biasing structure such as a clip spring may be used to retain the end of a display in a housing while allowing the display to slide relative to the housing in accordance with an embodiment.

FIG. 72 shows how a sliding clip structure such as clip spring 396 may be used to retain display 14 within housing 12. Clip spring 396 may help hold display 14 in place against housing 12 so that dust and other foreign matter does not enter the interior of device 10. At the same time, spring 396 may allow display 14 to slide past housing 12 (see, e.g., dashed line 400) when device 10 is unfolded. By allowing the end of display 14 to slip outwardly relative to housing 12, stress that might otherwise cause display 14 to bulge can be avoided.

The foregoing is merely illustrative and various modifications can be made by those skilled in the art without departing from the scope and spirit of the described embodiments. The foregoing embodiments may be implemented individually or in any combination.

What is claimed is:

1. An electronic device operable in folded and unfolded positions, comprising:
   a housing that folds along a fold axis, wherein the housing has first and second housing portions on opposing sides of the fold axis and wherein the first and second housing portions respectively comprise first and second slots;
   a flexible substrate that overlaps the first and second housing portions and that folds along the fold axis;
   a pixel array on the flexible substrate that overlaps the first and second housing portions and that extends across the fold axis; and
   a hinge coupled between the first and second housing portions, wherein the hinge comprises a first gear that rotates the first housing portion about the fold axis, a second gear that rotates the second housing portion about the fold axis, and a third gear coupled between the first and second gears, and wherein the first gear is coupled to a first pin that slides within the first slot during rotation and the second gear is coupled to a second pin that slides within the second slot during rotation.

2. The electronic device defined in claim 1 wherein the third gear rotates about an axis that is perpendicular to the fold axis.

3. The electronic device defined in claim 2 wherein the first and second gears rotate about respective first and second axes that are parallel to the fold axis.

4. The electronic device defined in claim 1 wherein the third gear comprises a helical gear.

5. The electronic device defined in claim 1 wherein the third gear causes the first and second gears to rotate by equal amounts when the electronic device moves between the folded and unfolded positions.

6. The electronic device defined in claim 1 wherein the first housing portion comprises a first planar member and a first flap and the second housing portion comprises a second planar member and a second flap.

7. The electronic device defined in claim 6 wherein the first flap rotates relative to the first planar member and the second flap rotates relative to the second planar member.

8. The electronic device defined in claim 7 wherein the first and second gears respectively rotate the first and second flaps away from each other when the electronic device moves from the unfolded position to the folded position.

9. The electronic device defined in claim 1 further comprising biasing structures that bias opposing edges of the flexible substrate outwardly from the hinge to hold the flexible substrate flat in the unfolded position.

10. The electronic device defined in claim 9 wherein the biasing structures comprise springs.

11. The electronic device defined in claim 10 further comprising a metal backplate behind the flexible substrate.

12. The electronic device defined in claim 11 further comprising a metal stiffening plate attached to a backside of the metal backplate.

13. An electronic device that folds and unfolds along a fold axis, comprising:
    a flexible substrate that folds along the fold axis;
    an array of organic light-emitting diode pixels on the flexible substrate;
    a metal backplate that supports the flexible substrate;
    a metal stiffening plate coupled behind the metal backplate, wherein the metal stiffening plate only partially overlaps the metal backplate; and
    first and second housing portions coupled by a hinge having a first gear that rotates the first housing portion about the fold axis and a second gear that rotates the second housing portion about the fold axis.

14. The electronic device defined in claim 13 further comprising a biasing member that holds the flexible substrate flat when the electronic device is unfolded.

15. The electronic device defined in claim 13 wherein the biasing member comprises a spring.

16. The electronic device defined in claim 13 wherein the first and second housing portions each comprise a planar member and a flap that pivots relative to the planar member.

17. The electronic device defined in claim 13 further comprising a third gear coupled between the first and second gears that causes the first and second gears to rotate by equal amounts as the electronic device folds and unfolds.

18. An electronic device operable in folded and unfolded configurations, comprising:
    first and second housing portions that rotate about a fold axis;
    a hinge coupled between the first and second housing portions, wherein the hinge comprises a gear system that rotates the first and second housing portions by equal amounts when the electronic device transitions between the folded and unfolded configurations;
    a flexible display mounted to the first and second housing portions and overlapping the fold axis;
    first and second overlapping metal plates attached to a rear side of the flexible display, wherein the first metal plate is interposed between the flexible display and the second metal plate and wherein the second metal plate spans only partially across a lower surface of the first metal plate; and
    a spring-based biasing structure that holds the flexible display in a flat position when the electronic device is unfolded.

19. The electronic device defined in claim 18 wherein the gear system comprises a first gear coupled to the first housing portion and having a first rotational axis, a second gear coupled to the second housing portion and having a second rotational axis, and a third gear coupled between the first and second gears and having a third rotational axis.

20. The electronic device defined in claim 19 wherein the first and second rotational axes are parallel to the fold axis and the third rotational axis is perpendicular to the fold axis.

* * * * *